United States Patent
Seok et al.

(10) Patent No.: US 11,944,238 B2
(45) Date of Patent: Apr. 2, 2024

(54) BLENDER

(71) Applicant: LG ELECTRONICS INC., Seoul (KR)

(72) Inventors: Jun Ho Seok, Seoul (KR); Jong Ho Lee, Seoul (KR); Jeong Hoon Jeong, Seoul (KR); Young Soo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/608,423

(22) PCT Filed: May 8, 2020

(86) PCT No.: PCT/KR2020/006113
§ 371 (c)(1),
(2) Date: Nov. 2, 2021

(87) PCT Pub. No.: WO2020/226459
PCT Pub. Date: Nov. 12, 2020

(65) Prior Publication Data
US 2022/0225836 A1    Jul. 21, 2022

(30) Foreign Application Priority Data

May 8, 2019   (KR) .................. 10-2019-0053929
Nov. 4, 2019  (KR) .................. 10-2019-0139703

(51) Int. Cl.
*A47J 43/07*    (2006.01)
*A47J 43/046*   (2006.01)

(52) U.S. Cl.
CPC ......... *A47J 43/0761* (2013.01); *A47J 43/046* (2013.01); *A47J 43/0716* (2013.01)

(58) Field of Classification Search
CPC .. A47J 43/046; A47J 43/0761; A47J 43/0716; H02K 5/20; H02K 9/06
(Continued)

(56) References Cited

U.S. PATENT DOCUMENTS 4,412,158 A * 10/1983 Jefferson ................. H02P 23/24
                                                   388/903
5,273,358 A * 12/1993 Byrne ...................... H02K 9/06
                                                   366/205
(Continued)

FOREIGN PATENT DOCUMENTS

CN    204071831 U    1/2015
CN    105411433 A    3/2016
(Continued)

OTHER PUBLICATIONS

English Translation of: CN107951417A, Li, Gongke , "Spiral Air-Exhaust Air Channel of Stirrer Main Engine" Obtained from <https://worldwide.espacenet.com> on Dec. 8, 2022 (Year: 2022).*
(Continued)

*Primary Examiner* — Marc C Howell
*Assistant Examiner* — Patrick M McCarty
(74) *Attorney, Agent, or Firm* — Bryan Cave Leighton Paisner LLP

(57) ABSTRACT

A blender includes a container body in which food is accommodated, a main body to support the container body, and an air guide provided in the main body to guide discharging of air flowing through a motor assembly to below the main body.

18 Claims, 16 Drawing Sheets

(58) Field of Classification Search
USPC .................................................. 366/144, 205
See application file for complete search history.

(56) References Cited

U.S. PATENT DOCUMENTS

| | | | | |
|---|---|---|---|---|
| 8,579,220 | B2 * | 11/2013 | Buzian | A47J 43/085 |
| | | | | 241/292.1 |
| 2006/0007778 | A1 | 1/2006 | Tai et al. | |
| 2007/0133347 | A1 * | 6/2007 | Mok | A47J 43/046 |
| | | | | 366/205 |
| 2011/0222367 | A1 | 9/2011 | Allen | |
| 2012/0294109 | A1 * | 11/2012 | Boozer | A47J 43/0716 |
| | | | | 366/206 |
| 2014/0246529 | A1 * | 9/2014 | Kobos | A47J 43/046 |
| | | | | 241/100 |
| 2014/0301155 | A1 * | 10/2014 | Montgomery | B01F 35/32025 |
| | | | | 366/142 |
| 2016/0374515 | A1 * | 12/2016 | Stuart | A47J 43/0716 |
| | | | | 241/30 |
| 2017/0120208 | A1 * | 5/2017 | Kolar | G05B 19/409 |
| 2017/0265684 | A1 | 9/2017 | Roberts et al. | |
| 2018/0117548 | A1 | 5/2018 | Arnett et al. | |
| 2019/0021550 | A1 * | 1/2019 | Bock | A47J 43/046 |
| 2020/0028396 | A1 * | 1/2020 | Valentini | H02K 9/04 |

FOREIGN PATENT DOCUMENTS

| | | | | |
|---|---|---|---|---|
| CN | 205758378 | U | | 12/2016 |
| CN | 205758378 | U * | 12/2016 | |
| CN | 205831683 | U | | 12/2016 |
| CN | 206565829 | U | | 10/2017 |
| CN | 107951417 | A * | 4/2018 | .......... A47J 43/0716 |
| CN | 108309093 | A | | 7/2018 |
| CN | 108324134 | A * | 7/2018 | ............ A47J 43/046 |
| CN | 208192974 | U | | 12/2018 |
| CN | 109381070 | A * | 2/2019 | ............. A47J 19/00 |
| IN | 108402929 | A | | 8/2018 |
| JP | 2014-518714 | A | | 8/2014 |
| KR | 10-1668297 | B1 | | 10/2016 |
| KR | 101668297 | B1 | | 10/2016 |
| KR | 1016682970000 | B1 | | 10/2016 |
| KR | 10-2017-0122328 | A | | 11/2017 |
| KR | 10-2017-0129175 | A | | 11/2017 |
| KR | 1020170122328 | A | | 11/2017 |
| WO | 2018045851 | A1 | | 3/2018 |
| WO | 2018-072505 | A1 | | 4/2018 |

OTHER PUBLICATIONS

English translation of CN-205831683-U, Chen W et al. obtained from <https://worldwide.espacenet.com> (Year: 2023).*

* cited by examiner

BLENDER

CROSS-REFERENCE TO RELATED APPLICATION

This application is the National Stage filing under 35 U.S.C. 371 of International Application No. PCT/KR2020/006113, filed May 8, 2020, which claims the benefit of Korean Application Nos. 10-20190053929, filed on May 8, 2019, and 10-2019-0139703, filed on Nov. 4, 2019, the contents of which are all hereby incorporated by reference herein in their entirety.

TECHNICAL FIELD

The present disclosure relates to a blender and, more particularly, to a blender capable of forcing air to flow inside a motor assembly, and thus effectively dissipating heat.

BACKGROUND ART

Generally, a blender is also referred to as a mixer. The blender is used primarily to chop food accommodated in a container body into small pieces or mix the food by rotating a blade by a rotational force generated by a motor.

In a normal blender, a main body into which a motor operating by electricity is built is positioned below, and a container body in which food is accommodated is seated on the top of the main body. A blade for chopping the food into small pieces or mixing the food is provided inside the container body and is rotated by a rotational force generated by the motor.

After the food that needs to be chopped into small pieces is put into the container body, an operational button or a knob of the main body is used to drive the motor. The blade is rotated by the rotational force generated by the motor, and thus the food inside the container body is chopped into small pieces or mixed.

In recent years, various blenders of this type have been developed to satisfy the user's need for food in their busy everyday life. For example, small-sized hand-held blenders or large-sized high-volume blenders have been developed, and blenders capable of grinding food at a high speed have also been developed.

In addition, vacuum blenders capable of slicing or grinding food accommodated in a container body under vacuum for processing food in a fresher state have been available on the market.

Electronic components, such as a motor assembly and PCB modules, that are necessary for operation control, are mounted in these various types of blenders. However, when each of these blenders is in operation, heat occurs in the motor assembly or the PCB module, and thus component malfunction can occur.

For this reason, a cooling fan or the like is mounted in the blender in the related art in order to prevent the occurrence of heat and to cool the electronic components.

For example, a cooling fan forces air to flow inside a mixer as disclosed in Korean Patent No. 10-1713194. However, in the mixer of the related art, air does not flow through the motor assembly, and thus the cooling fan is not effective in reducing heat occurring in a coil inside the motor.

The blender system disclosed in WIPO Publication No. WO 2018/034979 A1 employs a configuration in which a cooling fan provided on a lower end portion of a motor shaft forces air to flow into a motor.

With this configuration, air flows through a motor, but other electronic components, such as PCB modules, are not properly cooled. Furthermore, hot air that circulates throughout a main body is discharged through a lateral surface of a blender. Thus, the hot air can come into contact with people.

SUMMARY

An aspect of the present disclosure, which is made to solve the problems in the related art as described above, is to provide a blender capable of discharging air that cools components inside a main body to below the main body.

Another aspect of the present disclosure is to provide a blender capable of forcing air introduced into a main body to pass through a PCB module and a motor assembly, and then discharging the air to below the main body.

Still another aspect of the present disclosure is to provide a blender capable of forcing air to flow through a motor assembly in an upward-downward direction, with a lateral surface of a motor housing of the motor assembly being blocked.

Still another aspect of the present disclosure is to provide a blender equipped with an air guide configured to guide flowing of air passing through a motor assembly to below a main body.

Technical Solution

A feature of a blender according to the present disclosure that accomplishes the above-described objectives is that air introduced into a main body is discharged to below a main body. Therefore, hot air is prevented from coming into contact with a user.

In the blender according to the present disclosure, a motor housing of a motor assembly is configured in such a manner that a lateral surface is blocked. Therefore, air is prevented from flowing through the lateral surface of the motor housing, and thus flows through the motor assembly only in an upward-downward direction.

According to the present disclosure, an air guide is provided below the motor assembly, and guides discharging of the air flowing through the motor assembly in the upward-downward direction directly to below the main body. Therefore, the air flows through a motor in the upward-downward direction, and thus the motor is capable of being effectively cooled.

According to the present disclosure, a hole configured to guide introducing of outside air and a hole configured to guide discharging of the outside air are formed in a base plate and a base support, respectively. Therefore, the air smoothly flows into and flows out of the main body.

According to the present disclosure, the holes through which the air flows are formed into the base plate and the base support, respectively. A guidance wall and a blocking wall that guide flowing of the air only in the upward-downward direction are formed on edges, respectively, of these holes.

According to the present disclosure, PCB modules and a heat dissipation member are mounted along a path along which the air flows.

According to the present disclosure, the air guide is fastened to the base plate using a hook. Therefore, operational efficiency of the blender is improved.

According to the present disclosure, an airtight member is mounted between the air guide and the motor assembly.

Therefore, only the air flowing through the motor assembly is forced to flow into the air guide, and thus the motor is efficiently cooled.

According to an aspect of the present disclosure, there is provided a blender including: a container body in which food is accommodated; and a main body provided underneath the container body and configured to support the container body; a container lid detachably mounted on an upper surface of the container body and opening and closing the top of the container body, wherein an air guide configured to guide discharging of air flowing through a motor assembly to below the main body is provided in the main body.

In the blender, a motor seating support configured to support the motor assembly may be formed on an upper surface of the air guide.

In the blender, an air hole through which air flowing through the motor assembly in an upward-downward direction flows into the air guide may be formed in the upper surface of the air guide in a manner that passes from the upper surface thereof from top to bottom.

In the blender, the air guide may be mounted on a base plate provided on a lower end portion of the main body.

In the blender, a guide seating part on which the air guide is mounted may be formed on the base plate, and a guide protrusion configured to guide mounting of the air guide may be formed on an edge of the guide seating part in a manner that protrudes upward from the edge thereof.

In the blender, a plurality of fastening hooks may be formed on the air guide, and a plurality of hook grooves may be formed in the base plate. Each of the fastening hooks and each of the hook grooves may be formed to shapes, respectively, that correspond to each other. With the plurality of fastening hooks and the plurality of hook grooves, the air guide and the base plate may be fixedly combined with each other.

In the blender, a cooling fan forcing the air to flow may be positioned inside the air guide.

In the blender, an air-exhaust guidance hole configured to guide discharging of the air forced by the cooling fan to flow may be formed in a first end portion of the base plate in a manner that passes through the first end portion thereof from top to bottom.

In the blender, an air-intake guidance hole configured to guide flowing of outside air introduced into the main body may be formed in a second end portion of the base plate in a manner that passes through the second end portion thereof from top to bottom.

In the blender, a base support having a space in which a wireless electric power module is accommodated may be provided underneath the base plate.

In the blender, an air-exhaust hole configured to guide discharging of air introduced through the air-exhaust guidance hole to the outside of the main body may be formed in a first end portion of the base support in a manner that passes through the first end portion thereof from top to bottom.

In the blender, an air-intake hole serving as a path along which the outside air is introduced into the main body may be formed in a second end portion of the base support in a manner that passes through the second end portion thereof from top to bottom.

In the blender, a guidance wall configured to block the air from flowing sideways may be formed in an edge of the air-intake guidance hole or an air-exhaust guidance hole in the base plate.

In the blender, a blocking wall configured to block the air from flowing sideways may be formed in an edge of the air-intake hole or the air-exhaust hole in the base support.

In the blender, the air guide may guide discharging of the air introduced into main body to below the main body.

In the blender, the motor seating support may include: a horizontal rib formed to a shape of a circular ring and configured to support a lower end portion of the motor assembly; and a vertical rib formed on the horizontal rib in a manner that protrudes upward therefrom and configured to block the motor assembly from being moved sideways.

In the blender, an airtight member formed of an elastic material may be provided between the motor assembly and the motor seating support.

In the blender, the airtight member may include a combination portion inserted into an upper portion of the vertical rib and a seating part formed on an inner circumferential surface of the combination portion in such a manner as to extend inward from the inner circumferential surface thereof and positioned on an upper surface of the horizontal rib.

In the blender, an upper housing and a lower housing may provide an exterior appearance of the motor assembly, and the upper housing may be closed at the lateral sides.

In the blender, the air-intake guidance hole in the base plate and the air-intake hole in the base support may be mounted at positions, respectively, that correspond to each other in the upward-downward direction.

In the blender, the air-exhaust guidance hole in the base plate and the air-exhaust hole in the base support may be mounted at positions, respectively, that correspond to each other in the upward-downward direction.

In the blender, a PCB module or a heat dissipation member may be mounted above the air-intake guidance hole in the base plate. Therefore, electronic components inside the main body can be efficiently cooled.

Advantageous Effects

A blender according to the present disclosure provides the following effects.

Firstly, in the blender according to the present disclosure, air introduced into a main body is discharged to below the main body. Therefore, hot air that results from exchanging heat with electronic components while circulating throughout a main body does not come into direct contact with a user. Thus, this provides the effect that a user can avoid undesirable contact with the hot air.

Secondly, in the blender according to the present disclosure, a motor housing of a motor assembly provided in the main body is configured in such a manner as to be closed at the lateral sides. That is, paths other than a path along which an electric wire passes are all blocked. Therefore, the air is prevented from flowing along a lateral surface of the motor housing and is allowed to flow through the motor assembly only in an upward-downward direction. This provides the effect that a coil inside a motor can be efficiently cooled.

Thirdly, according to the present disclosure, an air guide is provided below the motor assembly. The air guide guides discharging of air flowing through the motor assembly in the upward-downward direction directly to below the main body. Therefore, all air that is introduced into the main body flows through the motor assembly, and then is forced to be discharged out of the main body. Thus, the motor can be effectively cooled.

Fourthly, according to the present disclosure, a hole configured to guide introducing of outside air and a hole configured to guide discharging of the outside air are formed in a base plate and a base support, respectively. This provides the effect that air can be smoothly introduced from below the main body and can be smoothly discharged to below the main body.

Fifthly, according to the present disclosure, an air-intake guidance hole and an air-intake hole that guide introducing of air into the main body are formed in the base plate and the base support, respectively. A guidance wall and a blocking wall that guide flowing of the air only in the upward-downward direction are formed on edges, respectively, of the air-intake guidance hole and the air-intake hole. Therefore, the outside air is introduced directly into a PCB module, a heat dissipation member, and the like inside the main body from the outside. This provides the effect that the electronic components can be efficiently cooled.

Sixthly, according to the present disclosure, an air-exhaust guidance hole and an air-exhaust hole that guide discharging of the air introduced into the main body back to the outside of the main body are formed in the base plate and the base support, respectively. The guidance wall and the blocking wall that guide flowing of the air only in the upward-downward direction are formed on edges, respectively, of the air-exhaust guidance hole and the air-exhaust hole. Therefore, the hot air that results from exchanging heat with the electronic components while circulating throughout the main body is directly guided by the air guide, and then is discharged to below the main body. This provides the effect that neighboring components are not affected by the hot air.

Seventhly, according to the present disclosure, the PCB module or the heat dissipation member is mounted along a path through which the air flows. That is, the PCB module or the heat dissipation member is mounted above the air-intake guidance hole through which the outside air is introduced. This provides the effect that cooling of the PCB module or the heat dissipation member prevents the PCB module or the heat dissipation member from malfunctioning.

Eighthly, according to the present disclosure, the air guide is fastened to the base plate with a hook. Therefore, operational efficiency of the blender is improved.

Ninthly, according to the present disclosure, an airtight member formed of rubber is mounted between the air guide and the motor assembly. Therefore, only the air flowing through the motor assembly is forced to flow to the air guide. This provides the effect that loss of the cooling air is minimized, the motor is efficiently cooled, and introduction of fresh air and discharging of the hot air are facilitated.

DETAILED DESCRIPTION

A blender according to the present disclosure will be described in detail below with reference to the accompanying drawings.

Figure 1:
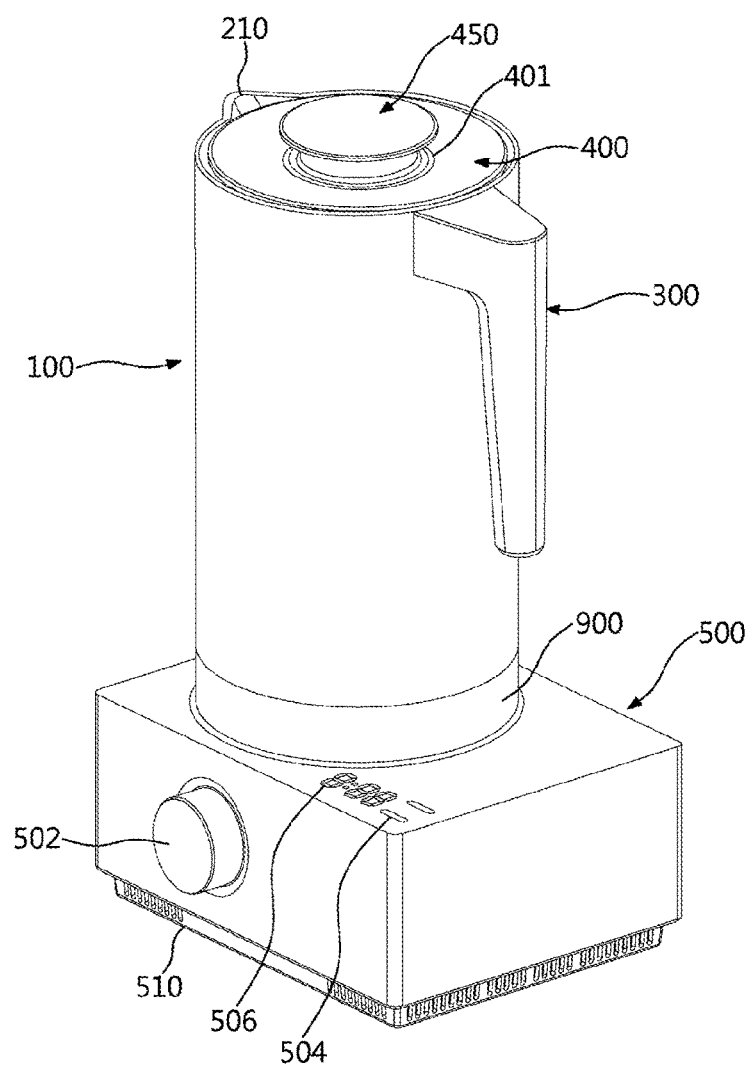
FIG. 1 is a perspective view illustrating a blender according to an embodiment of the present disclosure.
Figure 2:
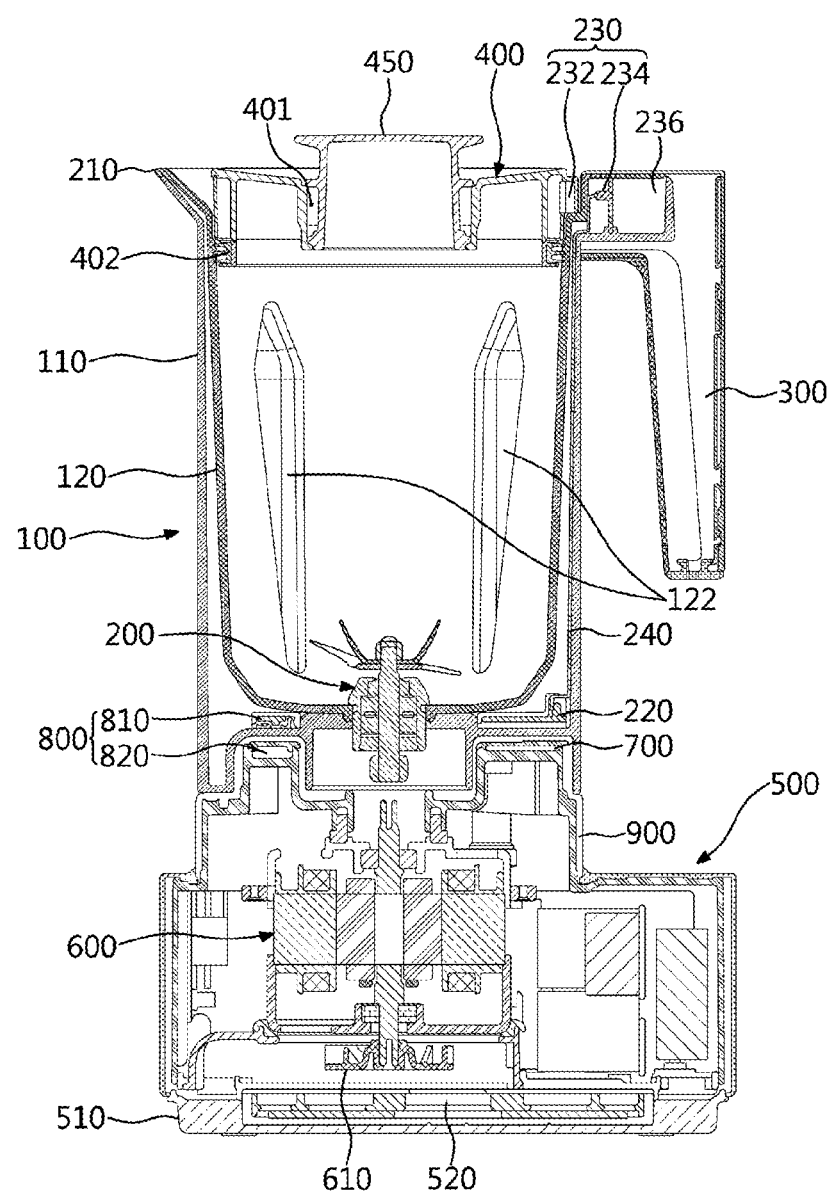
FIG. 2 is a longitudinally cross-sectional view illustrating an internal configuration of the blender according to an embodiment of present disclosure.

FIG. 1 is a perspective view illustrating a blender according to an embodiment of the present disclosure. FIG. 2 is a longitudinally cross-sectional view illustrating the blender to an embodiment of the present disclosure.

As illustrated in FIGS. 1 and 2, the blender according to the present disclosure is configured to include a container body 100, a main body 500, and the like. The container body 100 is positioned at a relatively great height and accommodates food. The main body 500 is provided underneath the container body 100 and supports the container body 100.

The food is accommodated into the container body 100 and is chopped into pieces or mixed there. The main body 500 supports the container body 100. A plurality of components that control the chopping and mixing of food in the container body 100, supply electric power, and perform other functions are provided inside the main body 500.

It is desirable that the entire container body 100 has the shape of a cylinder when viewed as a whole. The container body 100 is configured to be open at the top. Thus, the food may be inserted into and taken out of the container body 100.

It is desirable that the container body 100 is made of a transparent material in such a manner that the inside thereof may be viewed from the outside. That is, the container body 100 is made of glass or transparent plastic in such a manner that a user may visually check a state of the food inside the container body 100 from the outside.

A blade assembly 200 is mounted on the inside at the bottom of the container body 100. The blade assembly 200 is mounted in such a manner that a plurality of blades 206 (see FIG. 3) is rotatable. The blade assembly 200 chops the food accommodated in the container body 100 into small pieces or mixes the food accommodated therein.

The blade assembly 200 is configured in such a manner as to be connected to the motor assembly 600 described below and to be rotatable by a rotational force generated by the motor assembly 600.

It is desirable that the wall and bottom of the container body 100 are formed in a double-layered manner. That is, the container body 100 is configured to include an outer container body 110 that provides an exterior appearance of the container body 100 and an inner container body 120 that is positioned inside the outer container body 110. The outer container body 110 and the inner container body 120 may be configured in such a manner as to be brought into contact with each other or in such a manner as to be spaced apart from each other. It is also possible that the outer container body 110 and the inner container body 120 are configured in such a manner as to be partially brought into contact with each other.

One or more inner guides 122 that has a predetermined length in an upward-downward direction is provided inside the container body 100. The inner guide 122 serves to guide the rotating of the food inside the container body 100. It is desirable that the inner guides 122 are symmetrically arranged in pairs in the forward-backward direction or in the leftward-rightward direction.

A handle 300 that can be gripped with the user's hand is formed on a right-side surface of the container body 100 in a manner that protrudes rightward. It is desirable that the handle 300 is formed in such a manner that the user holds the handle 300 with their hand. According to the present disclosure, an example is illustrated where an upper end portion of the handle 300 is configured in such a manner as to be integrally combined with an upper end portion of an external surface of the container body 100.

A projection lip 210 is further formed on the upper portion of the external surface of the container body 100 in a manner that is opposite to the handle 300.

The projection lip 210, as illustrated, is formed on an upper portion of a left-side surface of the container body 100 and serves to guide the discharging of the small pieces of food inside the container body 100 in an easy manner to the outside. Therefore, it is desirable that the projection lip 210 is formed in such a manner that the nearer an upper end of the projection lip 210 is to the upper surface of the container body 100, the more the upper end thereof protrudes in the leftward direction.

The top of the container body 100 is covered by a container lid 400. That is, the container lid 400 is detachably mounted on the upper surface of the container body 100, and thus closes or opens the top of the container body 100.

The container lid 400 covers the top of the container body 100 in such a manner that the food does not spill out of the container body 100 to the outside, and blocks an outside foreign material from being introduced into the container body 100.

The container lid 400 is configured in such a manner as to be attached on the upper surface of the container body 100 by a user pressing the container lid 400 or rotating thereof. A gasket 402 is further provided on an outer circumferential surface of the container lid 400 and bridges a gap between the container lid 400 and the container body 100. Of course, the gasket 402 also serves to press the container lid 400 against the upper surface of the container body 100, and thus holds the container lid 400 firmly in place.

A cap 450 is further provided on the container lid 400. That is, a cover hole 401 that is a circular hole of a predetermined size is formed in a center portion of the container lid 400 in a manner that passes through the center portion thereof from top to bottom. The cap 450 is inserted into the cover hole 401 and plugs the cover hole 401.

The cap 450, as illustrated, is mounted on the center portion of the container lid 400. The cap 450 is formed in such a manner as to have a smaller diameter than the container lid 400 when viewed as a whole. It is desirable that the cap 450 is detachably mounted on the container lid 400 by forcefully inserting the cap 450 thereinto or by rotating the cap 450.

According to the present disclosure, an example is illustrated where the cap 450 is detachably mounted on the container lid 400 by rotating the cap 450. A detailed configuration of the cap 450 is described as follows.

The cap 450 is detachably mounted on the container lid 400. Thus, the user may observe the food inside the container body 100 without the need to detach the container lid 400 in a state where only the cap 450 is detached from the container lid 400. After the cap 450 is detached, it is also possible that the food is inserted into the container body 100 or that the food inside the container body 100 is mixed using a rod or the like.

An upper end portion of the cap 450 is formed in such a manner as to protrude more upward than an upper end portion of the container lid 400. Thus, the upper end portion thereof may also serve as a container lid handle that can be gripped with the user's hand when attaching or detaching the container lid 400.

As illustrated, the main body 500 is formed in such a manner as to have the shape of a parallelepiped when viewed as a whole. The main body 500 is provided underneath the container body 100 and supports the container body 100. A plurality of components including electronic components, such as the motor assembly 600 and a printed circuit board (PCB), are mounted inside the main body 500. Of course, the main body 500 may have an exterior appearance that can vary widely whenever necessary.

The motor assembly 600 is positioned inside at a center portion of the main body 500. The motor assembly 600 is supplied by electric power from the outside, and thus generates a rotational force. A blade 206 (see FIG. 3) constituting the blade assembly 200 is rotated by the generated rotational force.

Therefore, it is desirable that a lower end of the blade assembly 200 is connected to an upper end portion of the motor assembly 600.

A knob 502 is formed on a front surface of the main body 500 in a manner that it protrudes forward. The knob 502 serves to set the blender according to the present disclosure in operation. It is desirable that the knob 502 is rotatably mounted on the main body 500.

The knob 502 may also be configured in such a manner as to control a rotational speed of the motor assembly 600. That is, the knob 502 may be configured in such a manner that clockwise or counterclockwise rotation thereof changes the rotational speed of the motor assembly 600 from high to low or from low to high.

A touch operation unit 504 is provided on an upper surface of the main body 500.

The touch operation unit 504 serves to operate the blender according to the present disclosure via contact. It is desirable that the touch operation unit 504 is configured in such a manner as to perform operations, such as starting the blender and stopping the blender.

Of course, the knob 502 and the touch operation unit 504 may be configured in such a manner as to selectively perform a function of setting the blender and a function of operating the blender or in such a manner as to perform these two functions individually. That is, for convenience, according to the user's selection, one of the knob 502 and the touch operation unit 504 may be configured in such a manner as to perform the function of operating the blender or the function of setting the blender.

A display unit 506 is further provided adjacent to the touch operation unit 504 (to the left side of the touch operation unit 504 in FIG. 1). That is, the display unit 506 is further provided on the upper surface of the main body 500. The display unit 506 serves to display an operating state of the blender in such a manner as to be viewed by the user from the outside. Therefore, it is desirable that the display unit 506 is configured as a seven-segment display.

A cooling fan 610 that forces air to flow is further provided below the motor assembly 600.

The cooling fan 610 is connected to a lower end portion of the motor assembly 600, and thus is rotated by the rotational force generated by the motor assembly 600. Accordingly, outside air is forced to be introduced into the main body 500 and to be discharged back to the outside. In this manner, the cooling fan 610 introduces air into the main body 500 from the outside and then discharges the air to the outside. That is, the cooling fan 610 serves to cool components, such as a PCB, that are provided inside the main body 500.

A base support 510 is further provided on a lower surface of the main body 500.

The base support 510 is formed in such a manner as to protrude downward from a bottom surface of the main body 500. A space of a predetermined size is formed inside the base support 510. A wireless electric power module 520 is accommodated in this space. The wireless electric power module 520 is supplied with electric power from the outside in a wireless manner that uses an induced electromotive force and serves to supply the electric power to the motor assembly 600 inside the main body 500.

A detection system is further provided in the main body 500, the container body 100, and the like. The detection system detects whether or not the container lid 400 is attached on the upper surface of the container body 100.

An electric circuit (not illustrated) capable of being turned on and off is provided on the container body 100. The electric circuit forms a closed circuit. Thus, it is desirable that the detection system is configured in such a manner as to detect whether an electric current flows through the closed circuit by a voltage supplied from the main body 500.

More specifically, the detection system is configured to include an electric power transmission unit 700, an electric power reception unit 220, a turning-on and -off unit 230, a transparent electrode film 240, a detection unit 800, and the like. The electric power transmission unit 700 is provided in the main body 500 and supplies an electric power to the container body 100. The electric power reception unit 220 is provided in the container body 100 and receives the electric power supplied from the electric power transmission unit 700. The turning-on and -off unit 230 is provided on an upper end portion of the container body 100 and turns on and off an electric circuit formed in the container body 100 according to whether or not the container lid 400 is attached on an upper surface of the container body 100. The transparent electrode film 240 is made of a transparent material and is provided on one surface of the container body 100. The transparent electrode film 240 is connected to the electric power reception unit 220 and the turning-on and -off unit 230 in a manner that allows electricity to flow therebetween. The detection unit 800 is provided on one side of the main 500 or the container body 100 and detects whether or not an electric current flows through a closed circuit formed by the electric circuit connected to the electric power reception unit 220 and the turning-on and -off unit 230.

The electric power transmission unit 700 serves to transfer the electric power supplied to the main body 500 from the outside of the main body 500 or the electric power pre-stored in the main body 500 itself to the container body 100. It is desirable that an induction coil or the like where an induced electromotive force can occur is used as the electric power transmission unit 700.

The electric power reception unit 220 serves to receive the electric power transmitted from the main body 500 and has a structure corresponding to that of the electric power transmission unit 700. That is, it is desirable that the electric power reception unit 220 is configured as a coil in such a manner that by the induced electromotive force, the electric power is transferred between the electric power transmission unit 700 and the electric power reception unit 220.

It is desirable that the electric power transmission unit 700 and the electric power reception unit 220 are positioned adjacent to each other in such a manner as to generate the induced electromotive force. Therefore, according to the present disclosure, an example is illustrated where the electric power transmission unit 700 is mounted on an upper right end portion of the main body 500 and where the electric power reception unit 220 is mounted on a lower right end portion of the container body 100.

The turning-on and -off unit 230 serves to turn on and turn off the electric circuit (not illustrated) formed in the container body 100 according to whether or not the container lid 400 covers the top of the container body 100. The turning-on and -off unit 230 is configured to include a permanent magnet 232 and a reed switch 234 that are provided in the container lid 400 and the container body 100, respectively, and the like.

As illustrated in FIG. 2, according to the present disclosure, a case is illustrated where the permanent magnet 232 is mounted on a right edge of the container lid 400 and where the reed switch 234 is mounted on the upper end portion (a portion of the handle 300) of the container body 100.

More specifically, it is desirable that the reed switch 234 is mounted in such a manner as to be accommodated in a switch groove 236 formed in the upper end portion of the handle 300.

The reed switch consists of a pair of ferromagnetic flexible metal contacts in a hermetically sealed glass envelope. The contacts are open when a magnetic field is applied. The configuration of the reed switch is well known in the related art. Therefore, a further detailed description of the configuration and principle of the reed switch is omitted.

Of course, instead of the permanent magnet 232 and the reed switch 234, it is also possible that a different electric turning-on and -off unit or a mechanical structure is used, as the turning-on and -off unit 230, to turn on and off the electric circuit. It is also possible that the permanent magnet 232 and the reed switch 234 are mounted on the container lid 400 and the container body 100, respectively.

Various types of electric devices, various types of structures, or the like, if they have a function of being able to detect whether or not an electric current flows by the turning-on and -off unit 230 through the electric circuit formed in the container body 100, may be used as the detection unit 800. According to the present disclosure, the detection unit 800 is described by taking, as an example, detection of light that uses a photosensor or photodetector.

Therefore, the detection unit 800 is configured to include an optical transmission module 810, an optical reception module 820, and the like. The optical transmission module 810 is provided in the container body 100 and generates light. The optical reception module 820 is provided in the main body 500 and receives the light transmitted by the optical transmission module 810.

It is desirable that the optical transmission module 810 and the optical reception module 820 are positioned adjacent to each other. According to the present disclosure, as illustrated, the optical transmission module 810 is positioned on a lower left end portion of the container body 100, and the optical reception module 820 is positioned on an upper left end portion of the main body 500.

It is desirable that an light emitting diode (LED) or the like that generates light using electricity is used as the optical transmission module 810. It is desirable that a photosensor, a photodetector, or the like that receives light and converts the received light into an electric signal is used as the optical reception module 820.

Then, the transparent electrode film 240 is provided between the outer container body 110 and the inner container body 120. More specifically, it is desirable that the transparent electrode film 240 is mounted on an internal surface of the outer container body 110.

The transparent electrode film 240 is made of a transparent material, such as indium-tin oxide (ITO), and is attached on a surface of the container body 100. The turning-on and -off unit 230 provided on the upper end portion of the container body 100 is also connected to the electric power reception unit 220 and the optical transmission module 810, which are provided on a lower end portion of the container body 100, thereby constituting the electric circuit.

In this manner, the transparent electrode film 240 is attached on the surface of the container body 100 made of a transparent material in a manner that extends longitudinally in the upward-downward direction. Thus, the transparent electrode film 240 serves to guide transfer of an electric signal between upper and lower end portions of the container body 100.

When the container body 100 and the transparent electrode film 240 are both made of a transparent material, the transparent electrode film 240 is not visible to the outside. Thus, the transparent electrode film 240 does not spoil the exterior appearance of the container body 100, and a design of the container body 100 is visually aesthetic.

Then, in a case where the transparent electrode film 240 is attached on the surface of the container body 100, a hole may be formed in the transparent electrode film 240. The hole serves to remove a bubble occurring between the transparent electrode film 240 and the surface of the container body 100 on which the transparent electrode film 240 is attached. That is, in order to prevent the bubble from occurring, it is desirable that a hole is made through a center portion of the transparent electrode film 240 made of ITO in such a manner that the bubble escapes therethrough.

A seating support 900 is formed on the upper surface of the main body 500 in such a manner as to protrude upward therefrom.

The seating support 900 is formed to a circular shape that corresponds to a shape of the lower end portion of the container body 100. The lower end portion of the container body 100 is seated in the upward-downward direction on the seating support 900 in a manner that is removable therefrom.

The container body 100 is formed in a double-layered manner. That is, the container body 100 is configured to include the outer container body 110 and the inner container body 120. It is desirable that the inner guide 122 is formed in such a manner as to protrude inward from an internal surface of the inner container body 120.

A configuration of the container body 100 will be described in detail below.

Figure 3:
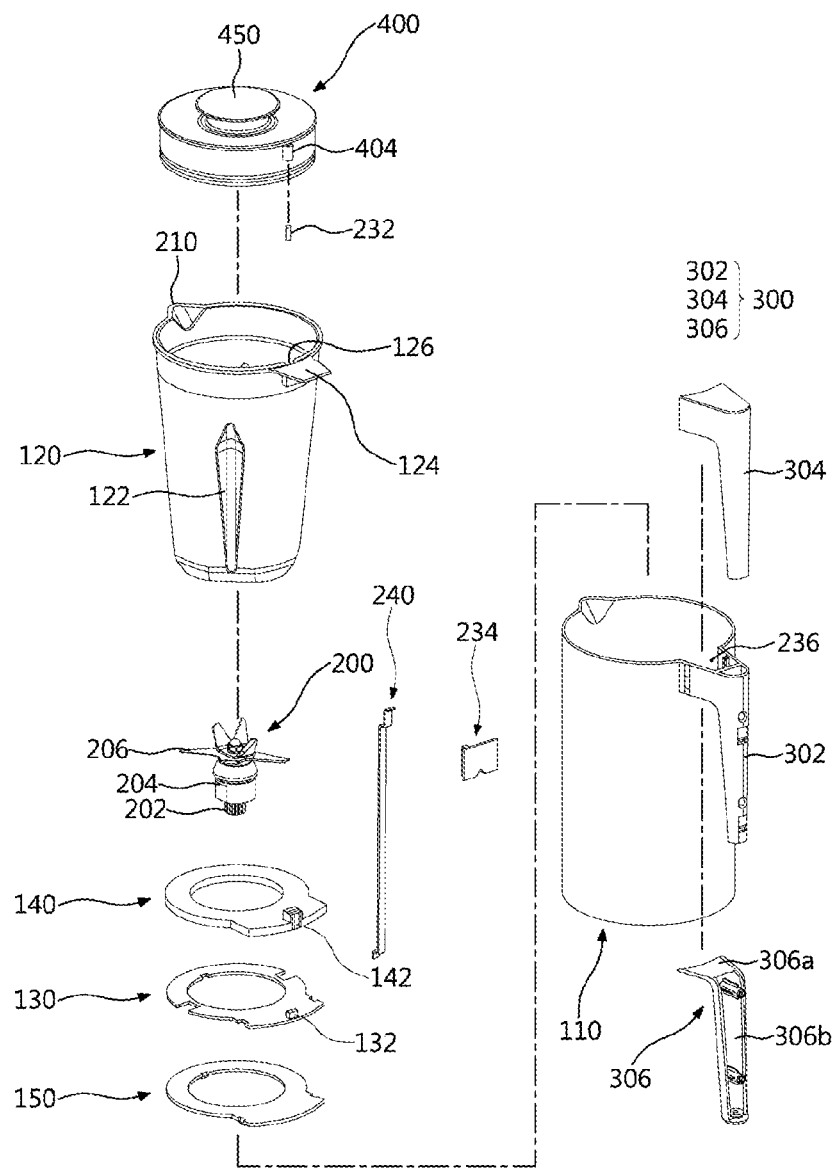
FIG. 3 is an exploded perspective view illustrating a detailed configuration of a container body that constitutes the blender according to an embodiment of the present disclosure.
Figure 4:
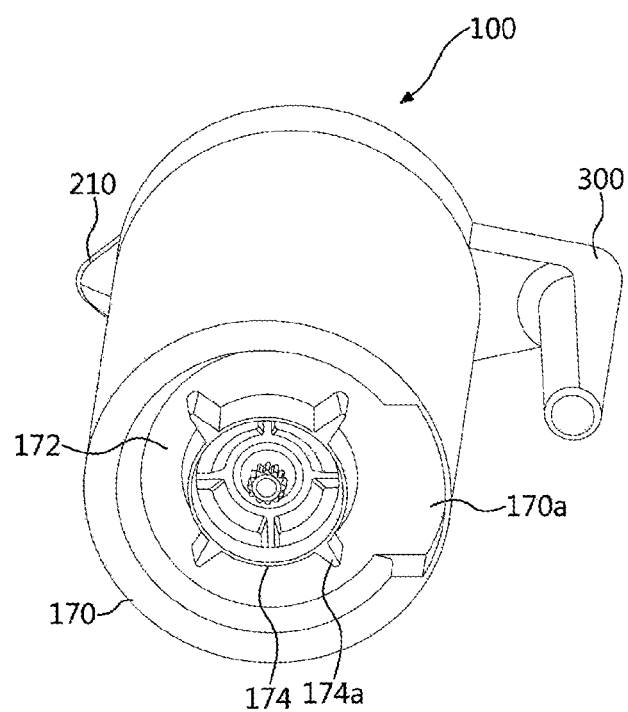
FIG. 4 is a perspective view illustrating the container body that constitutes the blender according to an embodiment of the present disclosure, when viewed from below.

FIG. 3 is an exploded perspective view illustrating the container body 100. FIG. 4 is a perspective view illustrating the container body 100, when viewed from below.

As illustrated in FIGS. 3 and 4, the container body 100 is formed in a cylindrical shape when viewed as a whole and is formed in a double-layered manner. That is, the container body 100 is configured to include the outer container body 110 that provides the exterior appearance of the container body 100 and the inner container body 120 that is inside the outer container body 110.

It is desirable that the container body 100, that is, the outer container body 110 and the inner container body 120 are made of a transparent material. That is, it is desirable that the outer container body 110 and the inner container body 120 are made of a transparent material, such as glass, polycyclohexylenedimethylene terephthalate (PCT), transparent plastic in such a manner that the user may visually check the state of the food inside the container body 100 from the outside.

The outer container body 110 provides the exterior appearance of the container body 100. It is desirable that the external container body 110 is formed in a cylindrical shape that has upper and lower portions of the same size. A main handle 302 is formed in such a manner as to protrude rightward from a right-side external surface of the outer container body 110. The main handle can be gripped with the user's hand.

The main handle 302 is formed in the shape of a "ㄱ". An upper end portion of the main handle 302 is connected to an upper right end portion of the outer container body 110. It is desirable that the main handle 302 is formed by injection molding in such a manner as to be integrally combined with the outer container body 110. The main handle 302 has a relatively improved strength and durability in terms of an advantage when formed by injection molding in such a manner as to be integrally combined with the outer container body 110 than when jointed or fixed, as a separate single component, to the outer container body 110.

The switch groove 236 in which the reed switch 234 is accommodated is formed in a portion of the main handle 302 that is connected to the container body 100. That is, the switch groove 236 is formed in the upper end portion of the main handle 302 and provides a space in which the reed switch 234 is mounted. The switch groove 236 is open at the left side.

An exterior handle 304 and an internal handle 306 are further provided in such a manner as to extend outward from the main handle 302. That is, as illustrated, the exterior handle 304 is provided at the right side of the main handle 302, and the internal handle 306 is provided at the left side thereof.

More specifically, like main handle 302, the exterior handle 304 is also formed to the shape of "ㄱ" when viewed as a whole. The exterior handle 304 is formed in such a manner as to enclose an upper surface, a right-side surface, and front and rear surfaces of the main handle 302. It is desirable that the exterior handle 304 is made of an unbreakable antirust material having a smooth surface, such as a stainless steel material. This formation of the exterior handle 304 provides a visually aesthetic impression to a consumer.

The internal handle 306 encloses a left-side surface and a bottom surface of the main handle 302. The internal handle 306 is formed to the shape of "ㄱ" that corresponds to a shape of the bottom surface of the main handle 302. It is desirable that at least one portion of the internal handle 306 is made of an elastic material.

Specifically, the internal handle 306 is configured to include a connection portion 306a, a grip portion 306b, and the like. The connection portion 306a encloses a lower part of the upper end portion of the main handle 302. The grip portion 306b is formed in such a manner as to extend downward from the connection portion 306a and encloses the left-side surface of the main handle 302.

It is desirable that, like the external handle 304, the connection portion 306a is made of an unbreakable material having a smooth surface. The grip portion 306b is covered by the user's fingers. Thus, it is desirable that the grip portion 306b is made of an elastic material. That is, it is desirable that the connection portion 306a is made of a stainless steel material. The grip portion 306b is covered by the user's four fingers (other than the thumb). Thus, it is desirable that grip portion 306b is made of an elastic material, such as rubber, that provides a sense of smooth touch to the user.

The inner container body 120 is formed in such a manner as to have a smaller size (diameter) than the outer container body 110 and is seated inside the outer container body 110.

The inner container body 120 is formed in a cylindrical shape that is open at the top. More specifically, as illustrated, the nearer a cross section of the inner container body 120 is to the bottom, the more decreased a diameter thereof. That is, the inner container body 120 is formed in such a manner as to be tapered to the bottom.

A plurality of inner guides 122 as described above is formed in the upward-downward direction in an external surface of the inner container body 120. The blade assembly 200 and the like are mounted on a lower end portion of the inner container body 120.

The projection lip 210 is formed on an upper left end portion of the inner container body 120 in a manner that protrudes leftward. A covering container lid 124 is formed on an upper right end portion of the inner container body 120 in a manner that extends rightward.

The covering container lid 124 serves to cover the top of the switch groove 236 in the outer container body 110. The covering container lid 124 is formed in a plate that has a predetermined thickness. In order to correspond to a size of an upper end portion of the switch groove 236, the covering container lid 124 is formed in such a manner that the more a right end thereof protrudes rightward, the smaller a width thereof.

The blade assembly 200 is mounted on the lower end portion of the inner container body 120.

The blade assembly 200 serves to chop food into small pieces or mix food using the blades. The blade assembly 200 is configured to include a blade shaft 202, a blade body 204, one or more blades 206, and the like. The blade shaft 202 receives the rotational force from the motor assembly 600 and is rotated thereby. The blade body 204 is provided underneath the blade shaft 202 and supports the blade shaft 202. The one or more blades 206 are connected to the blade shaft 202, and thus are rotated, thereby chopping the food into small pieces.

A magnet holder 404 is further provided on the outer circumferential surface of the container lid 400. That is, as illustrated, the magnet holder 404 is formed in the outer circumferential surface of the container lid 400 in a manner that protrudes outward. The permanent magnet 232 is inserted into the magnet holder 404.

When the container lid 400 is attached on the upper surface of the container body 100 or detached therefrom, the permanent magnet 232 serves to perform control to turn on and off the reed switch 234.

A coil holder assembly is further provided between the outer container body 110 and the inner container body 120.

The coil holder assembly is configured to include a coil holder 130, an upper cover 140, a lower cover 150, and the like. An induction coil is provided on the coil holder 130. The upper cover 140 and the lower cover 150 enclose upper and lower portions, respectively, of the coil holder 130.

Specifically, the coil holder 130 is provided between a bottom surface of the outer container body 110 and a bottom surface of the inner container body 120. The electric power reception unit 220 and the optical transmission module 810 are mounted on the coil holder 130.

The coil holder 130 has the shape of a circular ring of a predetermined width when viewed as a whole. The electric power reception unit 220 is provided on a right end portion of the coil holder 130 in the shape of the circular ring. That is, although not illustrated, the induction coil receiving electric power is provided on the right end portion of the coil holder 130 and constitutes the electric power reception unit 220.

The electric power reception unit 220 provided on the coil holder 130 is realized as a reception induction coil patterned in the same plane on a PCB. That is, in an implementation of the electric power reception unit 220, the reception induction coil is wound a number of times in helical form on a reception core on the PCB on the bottom surface of the coil holder 130.

The optical transmission module 810 is provided on the bottom surface of the coil holder 130.

The optical transmission module 810 emits light by electricity supplied from the electric power reception unit 220 and constitutes the detection unit 800. As described above, it is desirable that an LED or the like is used as the optical transmission module 810.

The electric power reception unit 220 and the optical transmission module 810 are electrically connected to each other. That is, the electric power reception unit 220 and the optical transmission module 810 are formed in such a manner as to form a closed circuit along with the turning-on and -off unit 230 and the like. Therefore, it is desirable that the electric power reception unit 220, the optical transmission module 810, the turning-on and -off unit 230, and the like are configured in such a manner as to be electrically connected to each other by a printed circuit board (PCB) or the like on the coil holder 130.

Although not illustrated, a conversion module that converts alternating current (AC) into direct current (DC) may be further provided on the coil holder 130.

A holder terminal 132 is provided on an upper surface of a right end portion of the coil holder 130.

A lower end portion of the transparent electrode film 240 is inserted into the holder terminal 132 for being connected thereto.

As illustrated, the coil holder 130 is formed in the shape of a ring when viewed as a whole. As illustrated, it is desirable that the coil holder 130 is formed in such a manner that the right end portion thereof has a relatively wide width so that the electric power reception unit 220 and the like are formed on the right end portion thereof.

A hole may be formed in outer and inner circumferential surfaces of the coil holder 130. A hook for fixing a plurality of components passes through the hole.

The coil holder 130 is protected by the upper and lower covers 140 and 150. The upper cover 140 and the lower cover 150 that correspond upper and lower surfaces, respectively, of the coil holder 130 are provided over and under the coil holder 130, respectively, and enclose upper and lower portions, respectively, of the coil holder 130.

A terminal holder 142 is formed on a right end portion of the upper cover 140 in a manner that protrudes upward. The holder terminal 132 of the coil holder 130 is accommodated in the terminal holder 142. Therefore, the holder terminal 132 is inserted, from below, into the terminal holder 142 for being accommodated therein. An upper portion of the terminal holder 142 is formed in such a manner as to have an opening at the part thereof. The lower end portion of the transparent electrode film 240 passes through the opening.

A hook may be formed on the upper cover 140. With the hook, the upper cover 140 is combined with the lower cover 150.

As described above, the transparent electrode film 240 is made of a transparent material, such as indium-tin oxide (ITO). The transparent electrode film 240 is configured in such a manner as to have a size corresponding to a length of the container body 100 in the upward-downward direction.

The transparent electrode film 240 is provided between the outer container body 110 and the inner container body 120. The presence of the transparent electrode film 240 between the outer container body 110 and the inner container body 120 prevents a contact with the food inside the inner container body 120 and blocks an outside foreign material from coming into contact with the outer container body 110 as well.

The transparent electrode film 240 may be attached on a surface of the outer container body 110 or may be attached on a surface of the inner container body 120. That is, the transparent electrode film 240 may be attached on the internal surface of the outer container body 110 or may be attached on an external surface (outer circumferential surface) of the inner container body 120.

A case where the transparent electrode film 240 is attached on the internal surface of the outer container body 110 in a manner that extends longitudinally in the upward-downward direction is described hereinafter as an example.

The transparent electrode film 240, as illustrated, is bent one or more times. A lower end portion thereof passes through the terminal holder 142 of the upper cover 140 and is connected to the holder terminal 132 of the coil holder 130, and an upper end portion thereof is connected to the reed switch 234.

That is, a film guide on which the transparent electrode film 240 is attached is formed on the internal surface of the outer container body 110 in a manner that extends longitudinally in the upward-downward direction. That is, the film guide is formed on a right-side surface of the outer container body 110 in a manner that extends longitudinally in the upward-downward direction, and thus guides attaching of the transparent electrode film 240.

A magnet groove 126 is formed in an upper end portion of the inner container body 120 in a manner that is cut outward. The permanent magnet 232 is accommodated in the magnet groove 126. That is, an end portion on the right side of the inner container body 120 is partly cut off rightward in a manner that has different heights, and thus the magnet groove 126 is formed. The permanent magnet 232 and the like are positioned in the magnet groove 126.

The container body 100 is formed in such a manner that a bottom surface thereof has a shape corresponding to a shape of the upper surface of the main body 500. With this configuration, the container body 100 is easily attached on and detached from the upper surface of the main body 500.

More specifically, the container body 100 is seated on the seating support 900 of the main body 500 described below.

The container body 100 is formed in such a manner that the bottom surface thereof has a shape corresponding to a shape of an upper end portion of the main body 500. Thus, the container body 100 is seated on the main body 500 and is easily removed therefrom.

An edge rim 170 of a predetermined width is formed on the bottom surface of the container body 100 in a manner that protrudes downward. The edge rim 170 is brought into contact with an upper surface of a lower rim 910 of the seating support 900 on the main body 500. The edge rim 170 is formed in a shape corresponding to a shape of an upper surface of the lower rim 910. The lower rim 910 will be described below.

One part of a center portion of the bottom surface of the container body 100 is recessed in the upward direction, and thus an upper-rim accommodation groove 172 is formed. That is, the one part of the center portion of the bottom surface of the container body 100 is recessed in the upward direction inward from the edge rim 170 of the container body 100, and thus the upper-rim accommodation groove 172 is formed. When the container body 100 is seated on the main body 500, an upper rim 920 of the seating support 900 on the main body 500 is accommodated in the upper-rim accommodation groove 172. The upper rim 920 will be described below.

The edge rim 170 is formed to a shape of a circular ring that has an opening at one portion thereof. A coil seating part 940 described below is accommodated in this opening. That is, the edge rim 170 is open at the right end, and thus a coil seating groove 170a is formed. The coil seating part 940 described below is accommodated in the coil seating groove 170a.

One part of the center portion of the bottom surface of the container body 100 protrudes downward, and thus a circular rim 174 is formed. That is, the center portion of the upper-rim accommodation groove 172 includes the circular rim 174 protruding downward.

As illustrated, the circular rim 174 has the shape of a circular ring. The circular rim 174 is open at the center. The circular rim 174 provides a path along which the blade assembly 200 and the motor assembly 600 may be connected to each other.

The circular rim 174 is accommodated in a circular-rim accommodation groove 980 formed in the main body 500. The circular-rim accommodation groove 980 will be described below.

A plurality of mounting protrusions 174a that protrude radially is further provided on an outer circumferential surface of the circular rim 174. The mounting protrusion 174a serves to hold the container body 100 firmly at its home position on the main body 500 and to keep the container body 100 stationary without being rotated. One or more mounting protrusions 174a are provided.

According to the present disclosure, an example is illustrated where four mounting protrusions 174a are provided. It is desirable that the mounting protrusion 174a is formed in such a manner that the farther an end thereof extends outward from the outer circumferential surface of the circular rim 174, the more decreased a diameter thereof. The reason for this is to easily accommodate the mounting protrusion 174a in the protrusion groove 982 described below.

Figure 5:
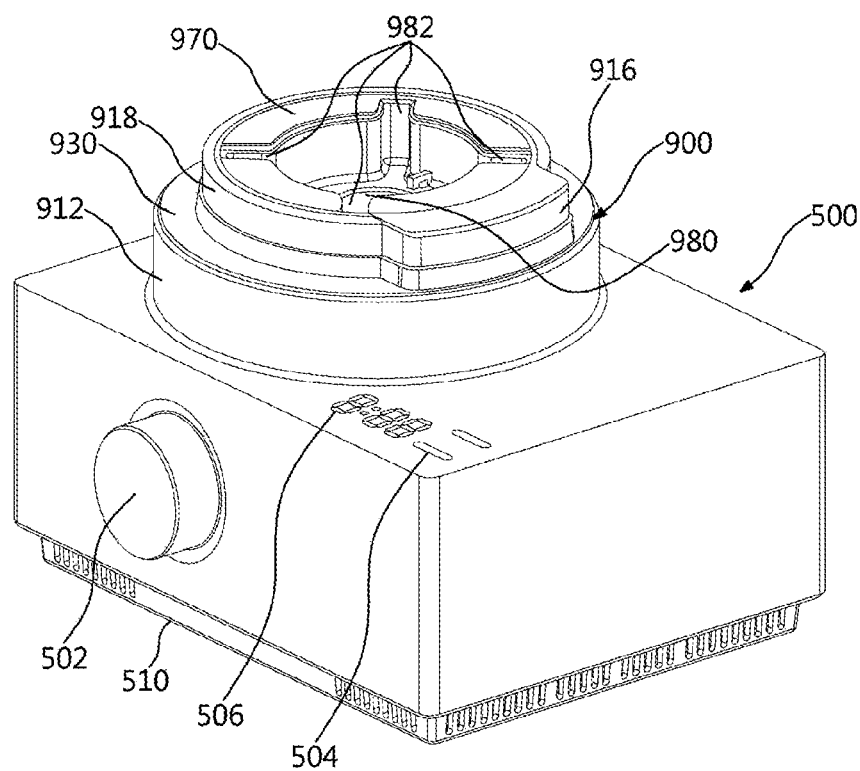
FIG. 5 is a perspective view illustrating a main body that constitutes the blender according to an embodiment of the present disclosure.
Figure 6:
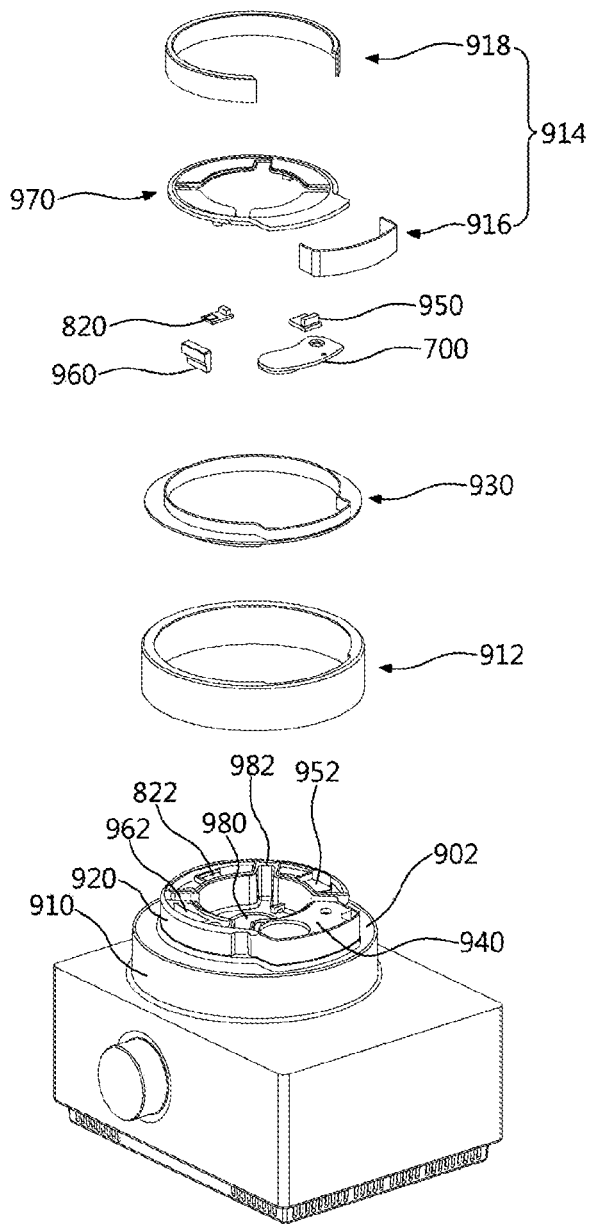
FIG. 6 is an exploded perspective view illustrating components in the upper half of the main body that constitutes the blender according to an embodiment of the present disclosure.
Figure 7:
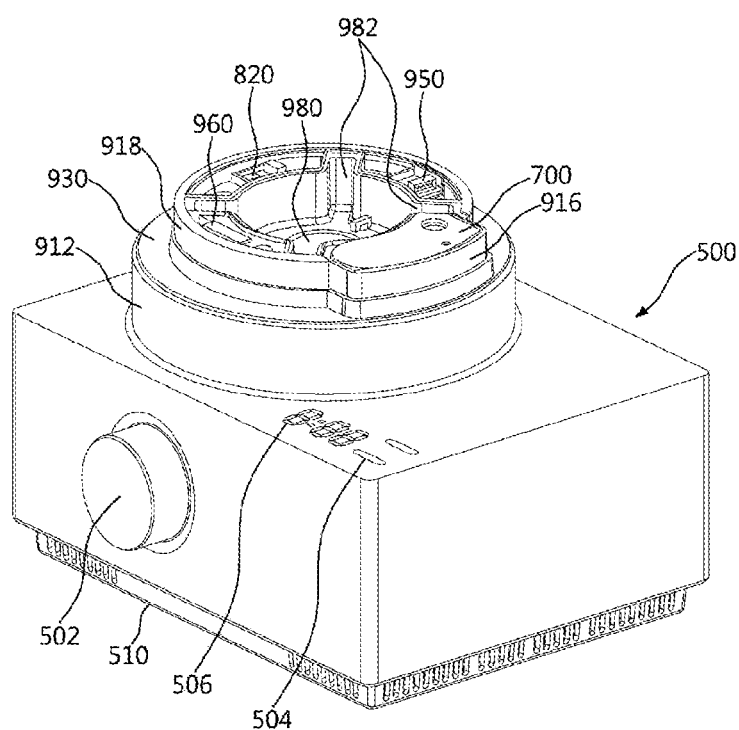
FIG. 7 is a perspective view illustrating a state where a cover is removed from the main body that constitutes the blender according to an embodiment of the present disclosure.

FIGS. 5 to 7 are views each illustrating in detail components in the upper half of the main body 500. FIG. 5 is a perspective view illustrating the main body 500. FIG. 6 is an exploded perspective view illustrating the components in the upper half of the main body 500. FIG. 7 is a perspective view illustrating a state where a cover is removed from the main body 500.

As illustrated in FIGS. 5 to 7, the seating support 900 is provided on the upper surface of the main body 500 in a manner that protrudes upward while having different heights. The bottom of the container body 100 is seated on the seating support 900.

The lower end portion of the container body 100 is seated on the seating support 900 and is supported thereon. Therefore, it is desirable that the seating support 900 is formed in such a manner as to have a shape corresponding to a shape of the lower end portion of the container body 100.

Specifically, the seating support 900 is configured to include the lower rim 910, the upper rim 920, and the like. The lower rim 910 is formed in such a manner as to have a different height and has a diameter corresponding to a diameter of the lower end portion of the container body 100. The upper rim 920 is formed in such a manner as to protrude upward from the lower rim 910 and has a smaller diameter than the lower rim 910.

As illustrated, the lower rim 910 is formed in such a manner as to have a circular shape and a predetermined height. The upper rim 920 having a smaller diameter than the lower rim 910 is formed on the upper surface of the lower rim 910 in such a manner as to protrude upward therefrom to a predetermined height. Therefore, it is desirable that a step surface 902, like the upper surface of the main body 500, is in the horizontal plane and is formed between the lower rim 910 having a relatively great diameter and the upper rim 920 having a relatively small diameter.

An exterior ring 912 and an upper end ring 914 are provided on external surfaces, respectively, of the lower rim 910 and the upper rim 920. The exterior ring 912 and an upper end ring 914 have shapes corresponding to shapes, respectively, of the external surfaces of the lower rim 910 and the upper rim 920. The exterior ring 912 and the upper end ring 914 are provided on outer circumferential surfaces, respectively, of the lower rim 910 and the upper rim 920 that have a circular external surface, and thus enclose external surfaces (flank surfaces), respectively, of the lower rim 910 and the upper rim 920.

The exterior ring 912 and the upper end ring 914 serve to protect components inside and serve as an exterior material. Therefore, it is desirable that like the exterior handle 304, the exterior ring 912 and the upper end ring 914 are made of an antirust material having a smooth surface, such as a stainless steel material.

An elastic member 930 made of an elastic material is further provided on the step surface 902 between the upper rim 920 and the lower rim 910. It is desirable that as illustrated, the elastic member 930 is formed in such a manner as to enclose the step surface 902 formed on the upper surface of the lower rim 910 and to enclose a lower portion of the upper rim 920.

The elastic member 930 is made of an elastic material, and thus serves as a cushion that absorbs shock when the container body 100 is placed on the main body 500. That is, when the bottom surface of the container body 100 is brought into contact with the upper rim 920, the elastic member 930 also serves to prevent the upper rim 920 and the lower rim 910 on the main body 500, which are formed of a solid material, and the bottom surface of the container body 100 from being damaged or from generating noise due to collision with each other.

In this manner, the elastic member 930, made of a material such as rubber, is used to smoothly seat the container body 100 on the main body 500 without any shock. In addition, conductivity rubber may be used whenever necessary. In this case, conductivity rubber may also be provided on the bottom of the container body 100.

The electric power transmission unit 700 and the optical reception module 820 are mounted on an upper surface of the upper rim 920.

More specifically, a right-side surface of the upper rim 920 further protrudes rightward, and the coil seating part 940 is formed on the right-side surface thereof. The electric power transmission unit 700 is mounted on an upper surface of the coil seating part 940.

The electric power transmission unit 700 is positioned adjacent to the electric power reception unit 220 provided on the container body 100 and serves to supply electric power to the electric power reception unit 220. Therefore, it is desirable that the electric power transmission unit 700 is configured as an induction coil. That is, like the electric power reception unit 220, the electric power transmission unit 700 may be configured as an induction coil wound a number of times in helical form on a core (not illustrated) on the same surface and may be mounted on a PCB.

In addition, although not illustrated in detail, an oscillation circuit unit may be provided inside the main body 500. The oscillation circuit unit may generate electric power and may apply electric current to the electric power transmission unit 700. A magnetic field may be produced by the electric current applied to the electric power transmission unit 700. Then, the oscillation circuit unit may change strength of the electric current that is applied to the electric power transmission unit 700, and the change in the strength of the electric current changes the magnetic field in the electric power transmission unit 700.

Therefore, according to the present disclosure, when the electric power reception unit 220 and the electric power transmission unit 700 are mounted in such a manner as to correspond to each other in the upward-downward direction, the strength of the electric current that is applied to the electric power transmission unit 700 is changed, and the magnetic field in the electric power transmission unit 700 is accordingly changed. Thus, inductive coupling between the electric power transmission unit 700 and the electric power reception unit 220 changes with the magnetic flux passing through the electric power reception unit 220. Consequently, an induced electromotive force develops in the electric power reception unit 220. This induced electromotive force may also be supplied to the optical transmission module 810.

The optical reception module 820 is provided in a direction opposite to a direction of the electric power transmission unit 700. That is, it is desirable that the optical reception module 820 is provided in a reception groove 822 formed in an upper surface of a left end portion of the upper rim 920. The reception groove 822 is positioned in a manner that corresponds in the upward-downward direction to the optical transmission module 810 mounted on the container body 100.

More specifically, the reception groove 822 of a predetermined size is formed in the upper surface of the left end portion of the upper rim 920 in a manner that is cut downward. The optical reception module 820 is fixedly mounted in the reception groove 822.

It is desirable that the optical reception module 820, as described above, includes a photosensor or photodetector. The optical reception module 820 may receive light transmitted by the optical transmission module 810 and may transmit this received optical signal.

A Hall sensor 950 and a container body detection switch 960 may be further provided on the upper surface of the upper rim 920. That is, a container body switch groove 962 and a sensor groove 952 are formed in upper surfaces, respectively, of leading and rear end portions of the upper rim 920 in a manner that is cut downward. The container body detection switch 960 and the Hall sensor 950 are fixedly mounted in the container body switch groove 962 and the sensor groove 952, respectively.

The container body detection switch 960 is configured as a reed switch and serves to detect whether or not the container body 100 is seated on the upper surface of the main body 500. In a case where the container body detection switch 960 is mounted, a magnet (not illustrated) corresponding to the container body detection switch 960 is also further provided on the lower end portion of the container body 100.

The Hall sensor 950 serves to determine a type of the container body 100 seated on the main body 500. In this case, a signal transfer unit that corresponds to the bottom surface of the container body 100 may also be necessary.

The upper end ring 914 is mounted on an edge of the upper rim 920. It is desirable that the upper end ring 914 is configured in such a manner as to be separated into two pieces. That is, as illustrated, the right-side surface of the upper rim 920 protrudes rightward, and thus the coil seating part 940 is formed. Therefore, the upper end ring 914 is configured to include a protrusion piece 916 and a curvature piece 918. The protrusion piece 916 encloses an external surface of the coil seating part 940. The curvature piece 918 encloses portions other than the external surface thereof.

An upper portion of the upper rim 920 is covered by a cover 970. Therefore, the electric power transmission unit 700, the optical reception module 820, the container body detection switch 960, the Hall sensor 950, and the like that are mounted on the upper rim 920 are covered by the cover 970 to be protected.

A center portion of the seating support 900 is open at the top and bottom. Thus, the blade assembly 200 of the container body 100 and the motor assembly 600 built into the main body 500 are connected to each other.

More specifically, the circular-rim accommodation groove 980 is formed in a center portion of the upper rim 920 in a manner that is cut downward. The above-described circular rim 174 on a lower end of the container body 100 is accommodated in the circular-rim accommodation groove 980. That is, the upper rim 920 has the shape of a circular ring when viewed as a whole. The circular-rim accommodation groove 980 in the shape of a circle is formed in the center portion of the upper rim 920.

One or more protrusion grooves 982 are formed in an internal surface of the upper rim 920. One or more portions of the protrusion groove 982 are recessed outward, and thus one or more circular-rim accommodation grooves 980 are radially formed. The mounting protrusion 174a of the container body 100 is seated in the circular-rim accommodation groove 982.

Therefore, it is desirable that the number of the protrusion grooves 982 is the same as the number of the mounting protrusions 174a and that the protrusion groove 982 is formed in such a manner that a size thereof corresponds to a size of the mounting protrusion 174a. It is desirable that the protrusion groove 982 is formed in such a manner as to have the same width as or a greater width than the mounting protrusions 174a.

Figure 8:
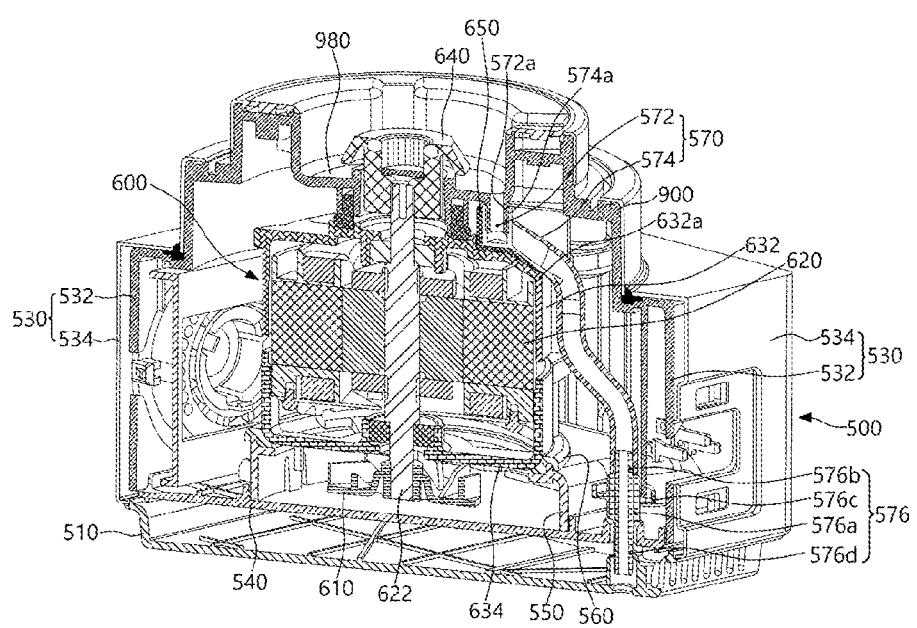
FIG. 8 is a perspective longitudinally cross-sectional view illustrating the main body that constitutes the blender according to an embodiment of the present disclosure.

FIG. 8 is a longitudinal cross-sectional view illustrating an internal configuration of the main body 500.

With reference to FIG. 8, the main body 500 may be formed in the shape of a hexahedron when viewed as a whole. A main-body casing 530 provides an exterior appearance.

As illustrated, the main-body casing 530 is formed in a shape of a hexahedron that is open at the bottom. The bottom of the main-body casing 530 is covered by a base plate 540 described below and the base support 510 described above.

The seating support 900 constitutes one part of an exterior appearance of an upper portion of the main-body casing 530. The seating support 900 is formed on a center portion of an upper surface of the main-body casing 530. Therefore, the seating support 900 constitutes one portion of the upper surface of the main body 500.

Then, it is desirable that the main-body casing 530 is formed in a double-layered manner. The main-body casing 530 may be configured to include an inner casing 532 and the outer casing 534. It is desirable that the outer casing 534 is made of a metal material or a metal-texture material.

The inner casing 532 is provided inside the outer casing 534 and substantially supports a plurality of internal components. Therefore, a space in which the motor assembly 600, the PCB module, and the like that are described above are to be mounted is formed inside the inner casing 532.

The motor assembly 600 is mounted in the center portion of the main body 500. The motor assembly 600 is configured to include a motor 620, a housing 630, and the like. The motor 620 is provided in such a manner that a motor shaft 622 passes through a center portion thereof from top to bottom. The housing 630 provides an exterior appearance of the motor 620.

The motor housing 630 is configured to include an upper housing 632, a lower housing 634, and the like. The upper housing 632 encloses an upper portion of the motor 620, and the lower housing 634 encloses a lower portion of the motor 620. The upper housing 632 and the lower housing 634 are firmly fastened to each other using a plurality of fastening bolts 636 or the like.

The motor shaft 622 is formed inside the main body 500 in a manner that extends longitudinally in the upward-downward direction. The cooling fan 610 described above is combined with a lower end portion of the motor shaft 622. A motive-power transfer disc 640 that is connected to the blade assembly 200 is connected to an upper end portion of the motor shaft 622. The motive-power transfer disc 640 is formed in such a manner as to protrude upward from the main body 500 and outward from its center and transfers a rotational force generated by the motor 620 to the blade assembly 200.

A plurality of PCB modules 542 is provided inside the main body 500.

Specifically, the open bottom of the inner case 532 constituting the main-body casing 530 is covered by the base plate 540. The plurality of PCB modules 542 is mounted above the base plate 540.

The base plate 540 is formed in a shape of a plate that corresponds to the open bottom of the inner casing 532. It is desirable that an edge of the base plate 540 is combined with a lower end portion of the inner casing 532.

The base plate 540 is provided on a lower end portion of the main body 500 and serves to support a plurality of components, such as the motor assembly 600 and the PCB module 542.

The base support 510 described above is provided underneath the base plate 540.

The PCB modules 542 may be arranged inside the inner casing 532 in such a manner as to be spaced apart from each other. The PCB modules 542 may be mounted separately according to their functions. That is, the PCB modules 542 may be arranged outside the motor assembly 600 in such a manner as to be spaced apart from each other to surround the motor assembly 600. The PCB modules 542 may include a main PCB module for controlling overall operations of the blender, an inverter PCB module for controlling the motor 620, a power PCB module for controlling input electric power, a PCB module for removing noise, and the like.

The PCB modules 542 may further include an additional PCB module associated with a function of the blender according to the present disclosure. One or several modules may be removed.

A heat dissipation member 544 for dissipating heat may be provided to the PCB module 542. It is desirable that the heat dissipation member 544, as illustrated, is mounted in such a manner as to be adjacent to at least one PCB module 542 among the PCB modules 542. The heat dissipation member 544 is configured in such a manner that a plurality of heat dissipation fins are brought into contact with air and dissipate heat.

An air guide 550 is provided on an upper surface of the base plate 540.

The air guide 550 guides discharging of air forced by the cooling fan 610 to flow. The motor assembly 600 is seated on an upper surface of the air guide 550. The cooling fan 610 is positioned inside the air guide 550.

The cooling fan 610 may have various types of blades. However, it is desirable that the cooling fan 610 is configured in such a manner as to absorb at least air inside the motor assembly 600 described above and then to discharge the air sideways or downward.

Therefore, when the cooling fan 610 is rotated along with the motor shaft 622, air outside the main body 500 is introduced into the main body 500, flows through the motor housing 630, and then flows downward. Thereafter, the air is forced by the cooling fan 610 to flow through the air guide 550 to be discharged.

An airtight member 560 is further provided between the air guide 550 and the motor assembly 600. That is, the motor assembly 600 is seated on the upper surface of the air guide 550. The airtight member 560 is provided on an edge of a seating surface of the lower end portion of the motor assembly 600.

It is desirable that the airtight member 560 is made of an elastic material, such as rubber. The airtight member 560 serves to protect the motor assembly 600 seated on the air guide 550 from shock. At the same time, the airtight member 560 bridges a gap between the motor assembly 600 and the air guide 550, thereby blocking air or liquid from flowing therethrough.

A discharge unit 570 is provided on the main body 500. The discharge unit 570 guides discharging of liquid or a foreign material remaining on the upper surface of the main body 500 to the outside.

The discharge unit 570 is configured to include a discharge hole 572, a discharge hose 574, and the like. The discharge hole 572 serves to guide liquid or food dropping remaining on the upper surface of the main body 500 toward the downward direction. The discharge hose 574 is provided underneath the discharge hole 572 and serves to guide flowing of the liquid or the food dropping through the discharge hole 572 to below the main body 500.

The discharge hole 572, as illustrated, is formed in such a manner as to pass through the upper surface of the main body 500 from top to bottom. It is desirable that the discharge hole 572 is a circular hole having a predetermined diameter.

More specifically, the discharge hole 572 is formed in the circular-rim accommodation groove 980 that is formed in the center portion of the upper rim 920 in a manner that is cut downward.

A groove connection portion 572a is formed on a lower end portion of the discharge hole 572 in such a manner as to extend downward therefrom and serves to guide flowing of the liquid or the foreign material introduced through the discharge hole 572 into the main body 500.

Specifically, the lower end portion of the discharge hole 572 that is formed in the bottom surface of the circular-rim accommodation groove 980 in a manner that passes through the circular-rim accommodation groove 980 from top to bottom extends farther downward to form the groove connection portion 572a. Therefore, the groove connection portion 572a has the shape of a cylinder having an internal diameter corresponding to an internal diameter of the discharge hole 572.

An upper end portion of the discharge hose 574 is inserted into the groove connection portion 572a for being connected. More specifically, a pressing-fitting end portion 574a of the discharge hose 574 is inserted into the groove connection portion 572a. The pressing-fitting end portion 574a will be described below.

As illustrated, the discharge hose 574 connects an internal upper end portion of the main body 500 and internal lower end portion thereof to each other and serves as a path that guides the liquid and the foreign material remaining on the main body 500 to below the main body 500.

The discharge hose 574 is formed in such a manner as to have a predetermined length. The discharge hose 574 is open at the top and bottom. The discharge hose 574 has an internal hole having a predetermined diameter. The discharge hose 574 may be formed in such a manner as to be flexibly bent in order for the liquid or the foreign material to smoothly flow and in order to prevent interference with other components provided inside the main body 500.

It is desirable that the discharge hose 574 is made of an elastic material. It is also possible that the discharge hose 574 is made of a metal material, a plastic material, or the like.

The pressing-fitting end portion 574a enclosing the groove connection portion 572a is provided on an upper end portion of the discharge hose 574. With the discharge hose 574, the discharge hose 574 is combined with the groove connection portion 572a.

As illustrated, the pressing-fitting end portion 574a is formed in the shape of a cylinder that is open at the top. It is desirable that the pressing-fitting end portion 574a is formed in such a manner as to have an internal diameter corresponding to an external diameter of the groove connection portion 572a and to enclose the groove connection portion 572a from outside.

The reason why the pressing-fitting end portion 574a is combined with the groove connection portion 572a in such a manner as to enclose the groove connection portion 572a from outside is to discharge liquid or the like, introduced through a gap between the pressing-fitting end portion 574a and the groove connection portion 572a, downward through the discharge hose 574.

In a case where the pressing-fitting end portion 574a is made of an elastic material, such as rubber, it is also possible that the pressing-fitting end portion 574a is formed in such a manner that the internal diameter thereof is smaller than the external diameter of the groove connection portion 572a.

A hose holder 576 is further provided in the main body 500. The hose holder 576 serves to fix a lower end portion of the discharge hose 574 to a lower end portion of the main body 500.

The hose holder 576 serves to fixedly support a lower end portion of the discharge hose 574. The hose holder 576 is configured to include a holder body 576a, a hose insertion portion 576b, a holder wing 576c, a holder discharge portion 576d, and the like. The holder body 576a in the shape of a cylinder is mounted on the lower end portion of the main body 500. The hose insertion portion 576b is formed in such a manner as to extend upward from the holder body 576a and is inserted into the discharge hose 574. The holder wing 576c protrudes outward from an outer circumferential surface of the holder body 576a and guides seating of the hose holder 576 inside the main body 500. The holder discharge portion 576d is formed in such a manner as to extend downward from a lower end portion of the holder body 576a.

As illustrated, the holder body 576a is formed in a shape of a cylinder that has a predetermined width and is open at the top and bottom. It is desirable that the holder body 576a is formed in such a manner that an external diameter thereof is greater than an external diameter of the discharge hose 574 and is at least the same as the external diameter of the discharge hose 574.

The hose insertion portion 576b is formed in such a manner as to extend a predetermined distance upward from an upper end portion of the holder body 576a. The hose insertion portion 576b is formed in such a manner as to have an internal diameter corresponding to an internal diameter of the holder body 576a. An external diameter of the hose insertion portion 576b is such that the hose insertion portion 576b can be accommodated in the discharge hose 574.

Of course, in a case where the discharge hose 574 is made of an elastic material, the hose insertion portion 576b may be formed in such a manner as to have an external diameter that is greater than an internal diameter of a lower end portion of the discharge hose 574.

As illustrated, the holder wing 576c protrudes a predetermined distance outward from an external surface of a center portion of the holder body 576a, and then is bent vertically upward. That is, the holder wing 576c is formed in such a manner as to have a longitudinal cross section in the shape of "⊔" (see FIG. 8) and is combined with a rib or the like inside the main body 500.

The holder discharge portion 576d is formed in such a manner as to extend a predetermined distance downward from the lower end portion of the holder body 576a. It is desirable that the holder discharge portion 576d is mounted in such a manner as to pass through the base plate 540 from top to bottom.

As illustrated, the hose holder 576 is mounted on the base plate 540. The hose holder 576 fixedly supports a lower end portion of the discharge hose 574 and, at the same time, guides discharging of liquid or the like flowing through the discharge hose 574 to below the base plate 540.

The drain guide 650 configured to support a first end portion of the discharge hose 574 is further provided in the main body 500.

Specifically, the drain guide 650 is provided on an upper surface of the motor assembly 600. The drain guide 650 serves to prevent liquid passing through the upper surface of the main body 500 and introduced into the main body 500 from permeating into the motor assembly 600.

For example, in a case where the liquid permeating into the main body 500 is not introduced into the discharge hose 574, the drain guide 650 also guides flowing of the liquid in such a manner that the liquid does not permeate into the motor assembly 600. Then, in a case where the upper end portion of the discharge hose 574 positioned over the drain guide 650 is damaged or torn, the drain guide 650 serves to guide the liquid leaking from the damaged or torn upper end portion of the discharge hose 574, to prevent the leaking liquid from permeating into the motor assembly 600, and to force the leaking liquid to flow to the outside of the motor assembly 600.

A guidance surface 632a is defined on the motor assembly 600. The guidance surface 632a serves to seat the drain guide 650.

Here, the guidance surface 632a is defined on an upper surface of the motor housing 630 constituting the motor assembly 600. The guidance surface 632a is formed in such a manner as to be gradually inclined downward from the upper surface of the motor housing 630.

Specifically, as described above, the motor housing 630 is configured to include the upper housing 632 and the lower housing 634. The guidance surface 632a is formed in an inclined manner on one edge of the upper surface of the upper housing 632 in such a manner that a height of the guidance surface 632a is gradually decreased.

The drain guide 650 is fixedly mounted on both the upper surface of the upper housing 632 and the guidance surface 632a.

Figure 9:
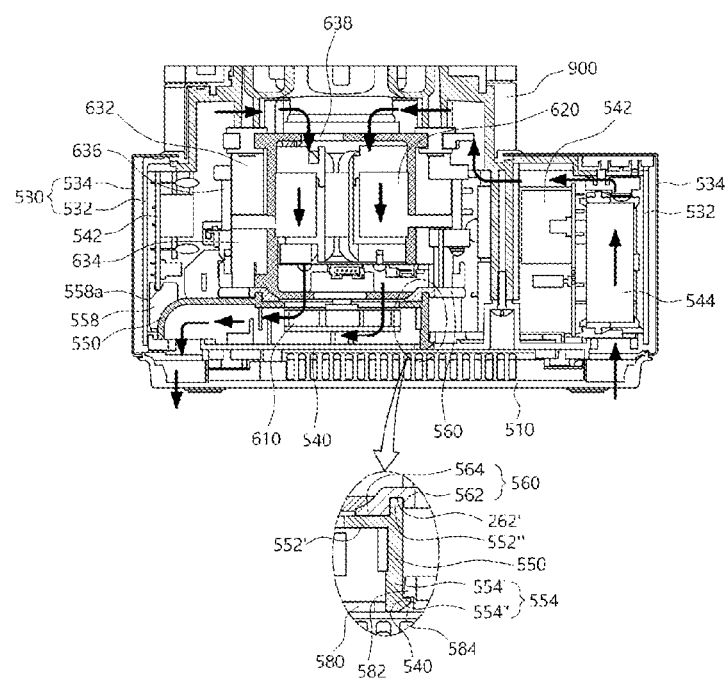
FIG. 9 is a partial longitudinally cross-sectional view illustrating the main body that constitutes the blender according to an embodiment of the present disclosure.
Figure 10:
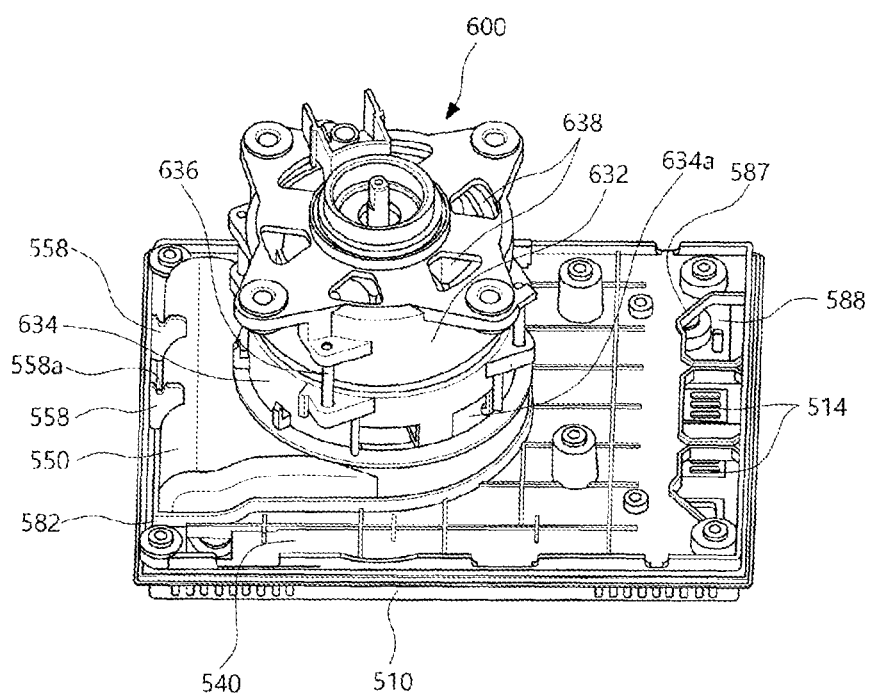
FIG. 10 is a perspective view illustrating a state where a motor assembly that constitutes the blender according to an embodiment of the present disclosure is mounted.
Figure 11:
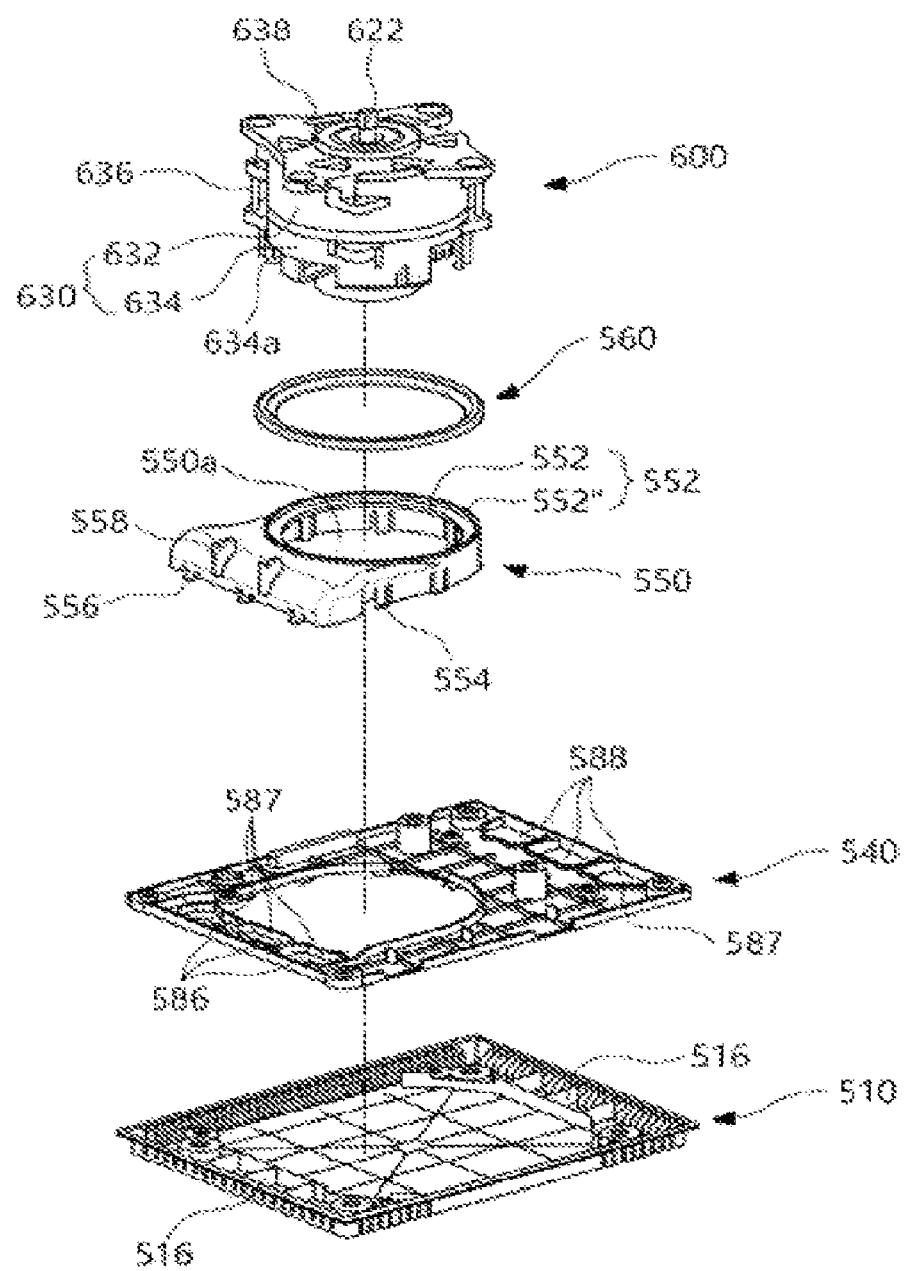
FIG. 11 is an exploded perspective view illustrating an air guide and a base plate that constitute the blender according to an embodiment of the present disclosure, when viewed from above.
Figure 12:
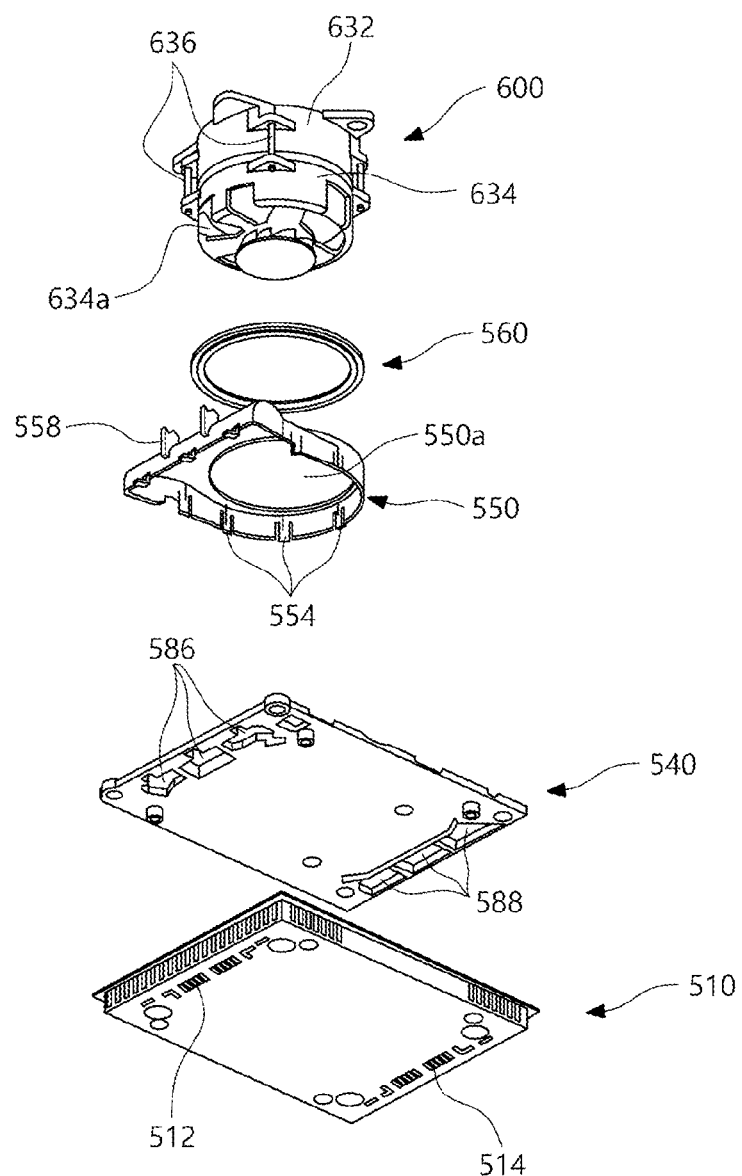
FIG. 12 is an exploded perspective view illustrating the air guide and the base plate that constitute the blender according to an embodiment of the present disclosure, when viewed from below.
Figure 13:
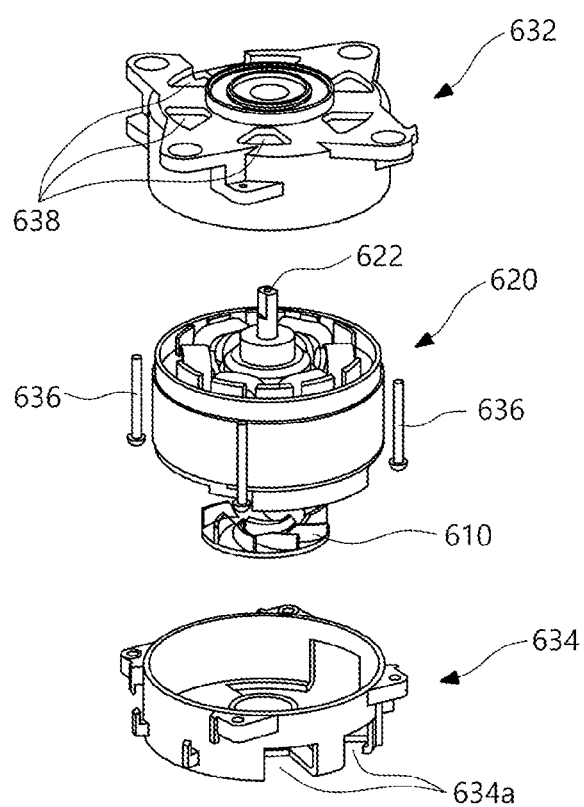
FIG. 13 is an exploded perspective view illustrating the motor assembly that constitutes the blender according to an embodiment of the present disclosure.
Figure 14:
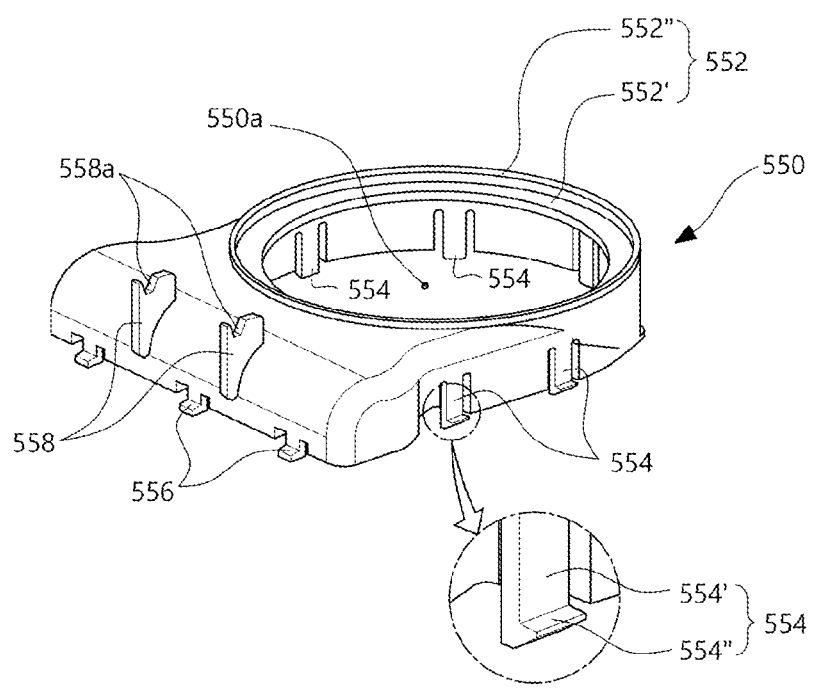
FIG. 14 is a perspective view illustrating a detailed configuration of the air guide that constitutes the blender according to an embodiment of the present disclosure.
Figure 15:
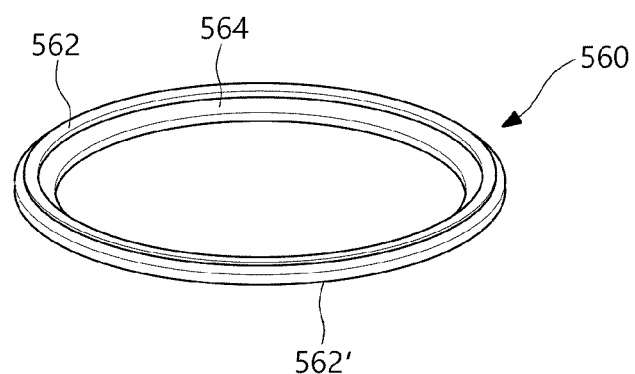
FIG. 15 is a perspective view illustrating a detailed configuration of an airtight member that constitutes the blender according to an embodiment of the present disclosure.
Figure 16:
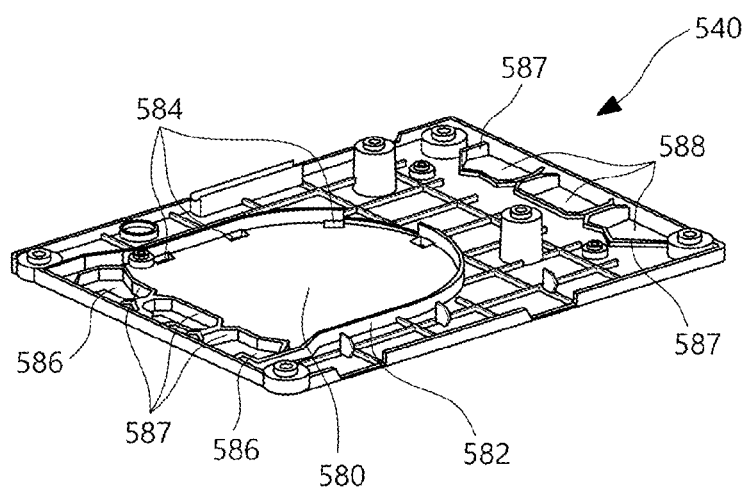
FIG. 16 is a perspective view illustrating a detailed configuration of the base plate that constitutes the blender according to an embodiment of the present disclosure.

FIGS. 9 to 16 are views each specifically illustrating in detail a plurality of components provided in the main body 500. FIG. 9 is a partial longitudinal cross-sectional view illustrating the main body 500. FIG. 10 is a perspective view illustrating a state where the motor assembly 600 is mounted. FIG. 11 is an exploded perspective view illustrating detailed configurations of the air guide 550, the base plate 540, and the like when viewed from above. FIG. 12 is an exploded perspective view illustrating the detailed configurations of the air guide 550, the base plate 540, and the like when viewed from below. FIG. 13 is an exploded perspective view illustrating the motor assembly 600. FIGS. 14 to 16 are perspective views illustrating detailed configurations, respectively, of the air guide 550, the airtight member 560, and the base plate 540.

As illustrated, the motor assembly 600 is mounted in a center portion of the main body 500. The motor assembly 600 is configured to include the motor shaft 622, the motor 620, the motor housing 630, and the like.

As described above, the motor housing 630 is configured to include the upper housing 632, the lower housing 634, and the like. The upper housing 632 encloses the upper portion of the motor 620, and the lower housing 634 encloses the lower portion of the motor 620. The upper housing 632 and the lower housing 634 are firmly fastened to each other using the plurality of fastening bolts 636 or the like.

The motor shaft 622 is mounted in the upward-downward direction in such a manner as to pass through a center portion of the motor 620 from top to bottom. The cooling fan 610 is combined with the lower end portion of the motor shaft 622. The cooling fan 610 is positioned inside the air guide 550 and forces air to flow. That is, with rotation of the cooling fan 610, air outside the main body 500 is introduced into the main body 500, flows along the air guide 550, and is discharged to below the main body 500.

As illustrated, a plurality of housing holes 638 are formed in an upper surface of the upper housing 632 in a manner that pass therethrough from top to bottom. Therefore, through the plurality of housing holes 638, air above the motor assembly 600 is introduced into the motor assembly 600.

It is desirable the motor housing 630 is configured in such a manner as to be closed at the lateral sides. That is, it is desirable that the upper housing 632 and the lower housing 634 are both closed at the lateral sides and that all air introduced into the motor assembly 600 through the housing hole 638 flows downward and is discharged into the air guide 550.

However, according to the present disclosure, a case is illustrated where an operation hole 634a through which an electric power wire for connecting terminals or for supplying electric power to the motor 620 passes is formed in the lower housing 634.

In this manner, the upper housing 632 and the lower housing 634 provide an exterior appearance of the motor assembly 600. The upper housing 632 is configured to be closed at the lateral sides. It is desirable that all portions of the lower housing 634 other than an essential hole, such as the operation hole 634a, are also sealed.

The motor housing 630 is closed at the lateral sides. The reason of this is to force all air introduced into the motor assembly 600 through the housing hole 638 in the upper housing 632 to flow to below the motor assembly 600, and then to be introduced into the air guide 550 without being discharged sideways.

The air guide 550 is provided in the main body 500. The air guide 550 guides discharging of the air flowing through the motor assembly 600 to below the main body 500. That is, as described above, the air guide 550 is brought into contact with the lower end portion of the motor assembly 600 and serves to guide the flowing of the air passing through the motor assembly 600 in the upward-downward direction to below the main body 500.

Specifically, the air guide 550 is mounted on the base plate 540 provided on the lower end portion of the main body 500.

Therefore, a guide seating part 580 on which the air guide 550 is seated is formed on the base plate 540. A guide protrusion 582 configured to guide mounting of the air guide 550 is formed on an edge of the guide seating part 580.

The guide seating part 580 has a shape corresponding to a lower portion of the air guide 550, when viewed as a whole. The guide protrusion 582 is formed in such a manner as to have a predetermined height in the upward and downward direction and encloses an external surface of a lower end portion of the air guide 550.

A hook groove 584 with which the fastening hook 554 is combined is further formed in the base plate 540. The fastening hook 554 will be described below. That is, the hook groove 584 is formed in a lower end portion of the guide protrusion 582 that constitutes the edge of the guide seating part 580.

It is desirable that the hook groove 584 is formed in a shape that corresponds to a shape of the fastening hook 554 described below. It is desirable that the hook groove 584 is formed in a manner that is cut outward from an internal surface of the lower end portion of the guide protrusion 582.

An air-exhaust guidance groove 586 is formed on a first end portion of the base plate 540 in a manner that passes through the one end portion thereof from top to bottom. The air-exhaust guidance groove 586 guides discharging of air forced by the cooling fan 610 to flow. That is, as illustrated, a plurality of the air-exhaust guidance groove 586 is formed in a left end portion of the base plate 540 in a manner that passes through the left end portion thereof from top to bottom.

An air-intake guidance hole 588 is formed on a second end portion of the base plate 540 in a manner that passes through the other end portion thereof from top to bottom. The air-intake guidance hole 588 guides flowing of outside air introduced into the main body 500. That is, as illustrated, the air-intake guidance hole 588 is formed in a right end portion of the base plate 540 in a manner that passes through the right end portion thereof from top to bottom. The air-intake guidance hole 588 guides flowing of air.

As described above, the base support 510 is provided underneath the base plate 540. The base support 510 has a space in which the wireless electric power module 520 is accommodated. Holes corresponding to the air-exhaust guidance groove 586 and the air-intake guidance hole 588, respectively, are also formed in the base support 510.

Specifically, an air-exhaust hole 512 is formed on a first end portion of the base support 510 in a manner that passes through the one end portion thereof from top to bottom. The air-exhaust hole 512 serves to guide discharging of air introduced through the air-exhaust guidance groove 586 toward the outside of the main body 500. That is, as illustrated, a plurality of air-exhaust holes 512 is formed in a left end portion of a bottom surface of the base support 510 in a manner that passes through the left end portion thereof from top to bottom.

An air-intake hole 514 is formed on a second end portion of the base support 510 in a manner that passes through the other end portion thereof from top to bottom. The air-intake hole 514 serves as a path along which air outside the main boy 500 is introduced into the main body 500. That is, a plurality of air-intake holes 514 is formed in a right end portion of the bottom surface of the base support 510 in a manner that passes through the right end portion thereof from top to bottom.

The air-intake guidance hole 588 in the base plate 540 and the air-intake hole 514 in the base support 510 are arranged at positions, respectively, that correspond to each other in the upward-downward direction. That is, it is desirable that the air-intake guidance hole 588 is positioned over the air-intake hole 514. The reason for this is to force air introduced into the main body 500 from the outside of the lower portion of the main body 500 through the air-intake hole 514 to directly flow through the air-intake guidance hole 588.

The air-exhaust guidance groove 586 in the base plate 540 and the air-exhaust hole 512 in the base support 510 are arranged at positions, respectively, that correspond to each other in the upward-downward direction. That is, it is desirable that the air-exhaust guidance groove 586 is positioned just over the air-exhaust hole 512. The reason for this is to force air inside the main body 500 flowing through the air-exhaust guidance groove 586 to be introduced directly into the air-exhaust hole 512.

Then, it is desirable that the PCB module 542 or the heat dissipation member 544 is mounted over the air-intake guidance hole 588 in the base plate 540. That is, in the main body 500, outside air flows from under a right end portion of the main body 500, flows through the air-intake hole 514 and the air-intake guidance hole 588, and then flows upward. Therefore, it is desirable that the PCB module 542 or the heat dissipation member 544 is mounted over the air-intake guidance hole 588 in order that heat exchange occurs when this cool outside air comes into contact with the PCB module 542 or the heat dissipation member 544.

A guidance wall 587 configured to block air from flowing sideways is further formed on edges of the air-intake guidance hole 588 or the air-exhaust guidance groove 586 in the base plate 540. That is, as illustrated, the guidance wall 587 that protrudes a predetermined distance in the upward direction is formed in the edges of the air-intake guidance hole 588 and the air-exhaust guidance groove 586.

The guidance wall 587 serves as a wall of the air-intake guidance hole 588 and the air-exhaust guidance groove 586. Thus, the guidance wall 587 prevents air flowing through the air-intake guidance hole 588 and the air-exhaust guidance groove 586 from flowing sideways and forces the air to flow only in the upward-downward direction.

A blocking wall 516 configured to block air from flowing sideways is further formed on an edge of the air-intake hole 514 or the air-exhaust hole 512 in the base support 510. That is, as illustrated, the blocking wall 516 that protrudes a predetermined distance in the upward direction is formed on the edges of the air-intake hole 514 and the air-exhaust hole 512.

Like the guidance wall 587, the blocking wall 516 serves to block air from flowing sideways and to guide flowing of the air in the upward-to-downward direction.

A motor seating support 552 configured to support the motor assembly 600 is formed on the upper surface of the air guide 550. The motor assembly 600 is seated on the air guide 550. To this end, the circular motor seating support 552 having a shape corresponding to a shape of the lower end portion of the motor assembly 600 is formed on the upper surface of the air guide 550.

The motor seating support 552 is configured to include a horizontal rib 552', a vertical rib 552", and the like. The horizontal rib 552' is formed to the shape of a circular ring and supports the lower end portion of the motor assembly 600. The vertical rib 552" is formed on the horizontal rib 552' in a manner that protrudes upward therefrom and blocks the motor assembly 600 from being moved sideways.

Specifically, an air hole 550a is formed in the upper surface of the air guide 550 in a manner that passes through the air guide 550 the from top to bottom. The air hole 550a serves to force air passing in the upward-downward direction through the motor assembly 600 to flow into the air guide 550.

The motor seating support 552 is formed on an edge of the air hole 550a.

Therefore, the air hole 550a is formed in a center portion of the horizontal rib 552' of the motor seating support 552 in a manner that passes through the center portion thereof from top to bottom.

The air guide 550 guides discharging of air introduced into the main body 500 to below the main body 500. Therefore, the air hole 550a is formed in a right-side portion of the air guide 550 in a manner that passes through the right-side portion thereof from top to bottom. The air hole 550a is closed at the top of the left-side portion thereof.

A plurality of fastening hooks 554 is provided on the air guide 550. That is, the air guide 550 is combined with the base plate 540. To this end, the plurality of fastening hooks 554 is provided on the air guide 550.

The fastening hook 554 is inserted into the hook groove 584 in the base plate 540 for being combined therewith. Therefore, the fastening hook 554 is formed to a shape corresponding to a shape of the hook groove 584.

Specifically, a support portion 554' is formed in a manner that is cut from a lateral surface of the air guide 550. The support portion 554' is formed in such a manner as to have a predetermined length in the upward-downward direction. A hook portion 554" is formed on a lower end portion of the support portion 554' in a manner that protrudes outward from the lower end portion thereof.

Therefore, the hook portion 554" is inserted into the hook groove 584 for being fixed thereto.

A fastening protrusion 556 may be further provided on the lower end portion of the air guide 550. The fastening protrusion 556 serves to fix the air guide 550 to the base plate 540. That is, as illustrated, a plurality of fastening protrusions 556 are provided on a left lower end portion of the air guide 550. A left end portion of the air guide 550 may be fixed to the base plate 540 with a bolt or the like.

One or more PCB seating protrusions 558 are formed on a left-side upper surface of the air guide 550 in a manner that protrudes upward from the left-side upper surface thereof. Any one of the PCB modules 542 is combined with the PCB seating protrusion 558. A seating groove 558a is formed in an upper end portion of the PCB seating protrusion 558 in a manner that is cut downward. A lower end portion of the PCB module 542 is accommodated in the seating groove 558a.

The airtight member 560 formed of an elastic material is further provided between the motor assembly 600 and the motor seating support 552.

The airtight member 560 serves to bridge a gap between the lower end portion of the motor assembly 600 and the air guide 550 in such a manner that air does not flow through the gap therebetween and, at the same time, to cushion the shock of the motor assembly 600 mounted on the air guide 550.

The airtight member 560 is configured to include a combination portion 562, a seating part 564, and the like. The combination portion 562 covers the upper portion of the vertical rib 552". The seating part 564 is formed on an inner circumferential surface of the combination portion 562 in such a manner as to extend inward from the inner circumferential surface thereof. The seating part 564 is positioned on an upper surface of the horizontal rib 552'.

Specifically, the airtight member 560 has the shape of a circular ring when viewed as a whole and is formed in such a manner as to have a size and a shape that corresponds to a size and a shape, respectively, of the motor seating support 552.

Therefore, the combination portion 562 is formed on the airtight member 560 in a manner that protrudes upward therefrom. The combination portion 562 is inserted into the vertical rib 552" of the motor seating support 552. The seating part 564 is formed inside the combination portion 562 and is placed on the upper surface of the horizontal rib 552'.

A combination groove 562' is further formed in a bottom surface of the combination portion 562 in a manner that is cut upward. The vertical rib 552" is inserted into the combination groove 562'.

Thus, an edge of the lower end portion of the lower housing 634 of the motor assembly 600 is brought into close contact with an internal surface of the combination portion 562 of the airtight member 560 and the seating part 564 for being supported thereon.

Operation of the blender according to the present disclosure that has the configuration as described above will be described below with reference to the accompanying drawings.

The container body 100 is seated on the main body 500 as illustrated in FIG. 1. In this state, the blender according to the present disclosure is ready for use.

First, electric power needs to be supplied from the outside in order to use the blender. It is possible that the wireless electric power module 520 supplies electric power in a wireless manner. That is, it is possible that electric power is supplied from the outside using an induced electromotive force. Of course, it is also possible that electric power is supplied in a wired manner.

The wireless electric power module 520 supplies electric power to components, such as the motor assembly 600, the touch operation unit 504, and the electric power transmission unit 700, that need electric power for operating. The user may operate the blender or may stop operating the blender by operating the touch operation unit 504 or the knob 502.

For example, when the user operates the touch operation unit 504 or the knob 502, the motor assembly 600 operates, blades of the blade assembly 200 are rotated, and then food is chopped into small pieces.

At this time, the detection system determines whether or not the container lid 400 is attached. In this case where the container lid 400 is not attached, the motor assembly 600 and the blade assembly 200 do not operate.

Specifically, the reed switch 234 is turned off when the blender is not in use. Therefore, the electric power reception unit 220, the reed switch 234, the optical transmission module 810, and the like do not form a closed circuit within the container body 100, and thus light reception does not occur in the optical reception module 820.

When the light reception does not occur in the optical reception module 820, with a signal/no signal representing the non-occurrence of the light reception, the motor assembly 600 is blocked from receiving electric power.

When the container lid 400 is attached in this state, the permanent magnet 232 of the container lid 400 is positioned in proximity to the reed switch 234, and thus the reed switch 234 is turned on. In return, the electric power reception unit 220, the reed switch 234, the optical transmission module 810, and the like form the closed circuit. Accordingly, the optical reception module 820 receives light that occurs in the optical transmission module 810.

Thus, when it is detected that the container lid 400 is attached, the motor assembly 600 starts to operate according to a user's operation. The food inside the container body 100 is chopped into small pieces. Of course, at this time, it is desirable that the container body detection switch 960 or the like also detects whether or the container body 100 is mounted on the main body 500, and thus that the motor assembly 600 starts to operate.

At this time, an operating state of the blender according to the present disclosure is displayed on the display unit 506 to be viewed from the outside. Thus, the user may visually recognize the operating state, operation time, and the like of the blender.

When attaching or detaching the container lid 400 on and from the container body 100, the user attaches or detaches the container lid 400 while holding an upper portion of the cap 450 with their hand. The user presses the container lid 400 in a direction of motion from upward to downward, and thus the container lid 400 is brought into close contact with the upper surface of the container body 100. At this time, the gasket 402 provided on an external surface of the container lid 400 bridges a gap between the container lid 400 and the container body 100.

In addition, the user may separate the cap 450 mounted on the center portion of the container lid 400 from the center portion thereof. As described above, the user may perform this separation operation by rotating the cap 450 while holding the upper end portion thereof with their hand.

When the cap 450 is separated from the container lid 400, the user may place food into the container body 100 through the cover hole 401 or may stir food inside the container body 100 using a rod or the like.

When, with the operation of each of the motor assembly 600 and the blade assembly 200, an operation of grinding food inside the container body 100 or an operation of mixing food inside the container body 100 is finished according to the user's intention, the user may lift the container body 100 upward from the main body 500 to separate therefrom, and then may detach the container lid 400 to take the food out of the container body 100.

The cooling fan 610 connected to the lower end portion of the motor shaft 622 is rotated by the operation of the motor assembly 600.

The rotation of the cooling fan 610 introduces outside air into the main body 500, and then discharges the outside air to below the main body 500.

Specifically, as illustrated in FIG. 9, the rotation of the cooling fan 610 forces outside air below the main body 500 to be introduced upward along the inside surface of the air-intake hole 514 formed adjacent to a right end portion of the base support 510.

Heat exchange occurs while the outside air introduced along the air-intake hole 514 ascends along the inside surface of the air-intake guidance hole 588 in the base plate 540 and flows through the PCB module 542, the heat dissipation member 544, and the like that are provided above the base plate 540. That is, the PCB module 542 and the heat dissipation member 544 exchange heat with the outside air, and thus are cooled.

Then, the outside air flows to a great height in the center inside the main body 500 and is introduced into the motor assembly 600 through the housing hole 638 formed in the upper surface of the motor housing 630.

The air introduced into the motor assembly 600 cools the motor 620 through heat exchange with a coil inside the motor 620. Thereafter, the air is discharged to below the motor assembly 600, flows through the air hole 550a in the air guide 550, and then flows into the air guide 550.

The air that is forced to flow sideways by the cooling fan 610 inside the air guide 550 flows to the left side of the air guide 550, flows through the air-exhaust guidance groove 586 formed adjacent to the left end portion of the air plate 540, and flows downward. Thereafter, the air flows through the air-exhaust hole 512 formed adjacent to a left end portion of the base support 510 and is discharged to below the main body 500.

Along the way, the air introduced into the main body 500 is discharged back to the outside of the main body 500. Along the way, electronic components inside the main body 500 are cooled.

The present disclosure is not limited to the embodiments described above. It would be apparent to a person of ordinary skill in the art that various modifications will be made to the embodiments of the present disclosure without departing the scope of the present disclosure.

What is claimed is:

1. A blender comprising:
   a container body for accommodating food;
   a main body to support the container body;
   a motor assembly disposed in the main body;
   a cooling fan coupled with the motor assembly at a lower end portion of the motor assembly;
   an air guide to guide discharging of air flowing through the motor assembly to below the main body;
   a base plate disposed at a lower end portion of the main body; and
   a base support disposed underneath the base plate and including an air-exhaust hole formed at a side end portion of the base support and an air-intake hole formed at an other side end portion of the base support,
   wherein the motor assembly is seated on an upper surface of the air guide,
   wherein the cooling fan to force the air to flow is disposed inside the air guide,
   wherein the air guide is mounted at the base plate,
   wherein the base plate comprises an air-exhaust guidance hole formed at a side end portion of the base plate and in communication with the air guide, the air-exhaust guidance hole to guide the air forced by cooling fan to flow sideways in the air guide to flow downward from the base plate and be discharged below the main body,
   wherein the base support comprises a blocking wall at the air-exhaust hole forming a barrier between the base support and the base plate to block the air from flowing sideways, the blocking wall further dividing the air-exhaust hole.

2. The blender of claim 1, wherein the air guide comprises a motor seating support disposed at the upper surface of the air guide to support the motor assembly.

3. The blender of claim 2, comprising an airtight member made of an elastic material disposed between the motor assembly and the motor seating support.

4. The blender of claim of 2, wherein the motor seating support comprises:
   a horizontal rib formed in a shape of a circular ring to support the lower end portion of the motor assembly; and
   a vertical rib disposed at the horizontal rib in a manner that protrudes upward from the horizontal rib to block the motor assembly from moving sideways.

5. The blender of claim 2, wherein the air guide comprises an air hole formed at the motor seating support through which the air flowing through the motor assembly from top to bottom flows into the air guide in a manner that passes through the upper surface of the air guide from the top to bottom.

6. The blender of claim 5, wherein the base plate comprises a guide seating part on which the air guide is mounted, and a guide protrusion to guide mounting of the air guide disposed at an edge of the guide seating part in a manner that protrudes upward from the edge of the guide seating part.

7. The blender of claim 1, wherein the base plate comprises an air-intake guidance hole formed at an other side end portion of the base plate to guide flowing of outside air introduced into the main body in a manner that passes through the other side end portion of the base plate from bottom to top.

8. The blender of claim 7, wherein a heat dissipation member is mounted above the air-intake guidance hole in the base plate.

9. The blender of claim 7, wherein a printed circuit board (PCB) is mounted above the air-intake guidance hole in the base plate.

10. The blender of claim 9, comprising one or more PCB seating protrusions disposed at an upper surface of the air guide to seat the PCB above the air-intake guidance hole in the base plate.

11. The blender of claim 7, wherein the air-exhaust hole formed at the side end portion of the base support guides discharging of the air introduced through the air-exhaust guidance hole to an outside of the main body in a manner that passes through the end portion of the base support from top to bottom, and the air-intake hole formed at the other side end portion of the base support serve as a path along which the outside air is introduced into the main body in a manner that passes through the other side end portion of the base support from the bottom to top and is introduced into the air-intake guidance hole of the base plate.

12. The blender of claim 7, comprising a guidance wall to block the air or the outside air from flowing sideways disposed at an edge of the air-intake guidance hole or the air-exhaust guidance hole at the base plate.

13. The blender of claim 11, wherein the air-intake guidance hole and the air-exhaust guidance hole at the base plate and the air-intake hole and the air-exhaust hole at the base support are mounted at positions, respectively, that correspond to each other vertically.

14. The blender of claim 11, wherein the base support comprises a space in which a wireless electric power module is accommodated.

15. The blender of claim 1, wherein the motor assembly comprises a housing hole formed at the upper surface of the motor assembly, wherein the air flows into the motor assembly through the housing hole.

16. The blender of claim 15, wherein the motor assembly is closed at the lateral sides of the motor assembly to force the air to flow through the motor assembly without being discharged sideways to below the motor assembly and be introduced into the air guide.

17. The blender of claim 1, wherein the motor assembly comprises a motor including a motor shaft that couples with the cooling fan to rotate the cooling fan.

18. The blender of claim 1, comprising another blocking wall at the air-intake hole forming another barrier between the base support and the base plate to block the outside air from flowing sideways, the another blocking wall further dividing the air-intake hole.

* * * * *